United States Patent
McMillen et al.

(10) Patent No.: US 10,884,496 B2
(45) Date of Patent: Jan. 5, 2021

(54) ONE-SIZE-FITS-ALL DATA GLOVE

(71) Applicant: BeBop Sensors, Inc., Berkeley, CA (US)

(72) Inventors: Keith A. McMillen, Berkeley, CA (US); Kyle Lobedan, Oakland, CA (US); William Walls, Oakland, CA (US); Brent Allen, Ross, CA (US)

(73) Assignee: BeBop Sensors, Inc., Berkeley, CA (US)

( * ) Notice: Subject to any disclaimer, the term of this patent is extended or adjusted under 35 U.S.C. 154(b) by 0 days.

(21) Appl. No.: 16/449,017

(22) Filed: Jun. 21, 2019

(65) Prior Publication Data

US 2020/0012344 A1    Jan. 9, 2020

Related U.S. Application Data

(60) Provisional application No. 62/694,334, filed on Jul. 5, 2018.

(51) Int. Cl.
*G06F 3/01*     (2006.01)
*G10H 1/00*    (2006.01)

(52) U.S. Cl.
CPC .............. *G06F 3/014* (2013.01); *G06F 3/016* (2013.01); *G10H 1/0008* (2013.01); *G10H 2240/056* (2013.01)

(58) Field of Classification Search
None
See application file for complete search history.

(56) References Cited

U.S. PATENT DOCUMENTS

| | | |
|---|---|---|
| 4,294,014 A | 10/1981 | Baumann et al. |
| 4,438,291 A | 3/1984 | Eichelberger et al. |
| 4,489,302 A | 12/1984 | Eventoff |
| 4,515,404 A | 5/1985 | Nishimura et al. |
| 4,693,530 A | 9/1987 | Stillie et al. |
| 4,734,034 A | 3/1988 | Maness et al. |
| 4,745,301 A | 5/1988 | Michalchik |
| 4,790,968 A | 12/1988 | Ohkawa et al. |
| 4,852,443 A | 8/1989 | Duncan et al. |
| 5,033,291 A | 7/1991 | Podoloff et al. |
| 5,079,949 A | 1/1992 | Tamori |
| 5,128,880 A | 7/1992 | White |
| 5,131,306 A | 7/1992 | Yamamoto |
| 5,159,159 A | 10/1992 | Asher |

(Continued)

FOREIGN PATENT DOCUMENTS

| | | |
|---|---|---|
| CN | 200980381 Y | 11/2007 |
| CN | 201920728 U | 8/2011 |

(Continued)

OTHER PUBLICATIONS

U.S. Office Action dated Sep. 12, 2012 issued in U.S. Appl. No. 12/904,657.

(Continued)

*Primary Examiner* — Joseph R Haley
(74) *Attorney, Agent, or Firm* — Weaver Austin Villeneuve & Sampson LLP

(57) ABSTRACT

Assemblies and techniques are described herein for use with a data glove. The data glove includes sensors configured to translate movement and forces associated with a human hand to the digital domain.

20 Claims, 10 Drawing Sheets

(56) References Cited

U.S. PATENT DOCUMENTS

| | | |
|---|---|---|
| 5,219,292 A | 6/1993 | Dickirson et al. |
| 5,237,520 A | 8/1993 | White |
| 5,288,938 A | 2/1994 | Wheaton |
| 5,316,017 A | 5/1994 | Edwards et al. |
| 5,386,720 A | 2/1995 | Toda et al. |
| 5,429,092 A | 7/1995 | Kamei |
| 5,571,973 A | 11/1996 | Taylot |
| 5,578,766 A | 11/1996 | Kondo |
| 5,624,132 A | 4/1997 | Blackburn et al. |
| 5,659,395 A | 8/1997 | Brown et al. |
| 5,695,859 A | 12/1997 | Burgess |
| 5,729,905 A | 3/1998 | Mathiasmeier et al. |
| 5,822,223 A | 10/1998 | Genest |
| 5,866,829 A | 2/1999 | Pecoraro |
| 5,878,359 A | 3/1999 | Takeda |
| 5,943,044 A | 8/1999 | Martinelli et al. |
| 5,989,700 A | 11/1999 | Krivopal |
| 6,029,358 A | 2/2000 | Mathiasmeier et al. |
| 6,032,109 A | 2/2000 | Ritmiller, III |
| 6,049,327 A | 4/2000 | Walker et al. |
| 6,087,930 A | 7/2000 | Kulka et al. |
| 6,121,869 A | 9/2000 | Burgess |
| 6,141,643 A | 10/2000 | Harmon |
| 6,155,120 A | 12/2000 | Taylor |
| 6,215,055 B1 | 4/2001 | Saravis |
| 6,216,545 B1 | 4/2001 | Taylor |
| 6,304,840 B1 | 10/2001 | Vance et al. |
| 6,331,893 B1 | 12/2001 | Brown et al. |
| 6,360,615 B1 | 3/2002 | Smela |
| 6,388,556 B1 | 5/2002 | Imai et al. |
| 6,452,479 B1 | 9/2002 | Sandbach |
| 6,486,776 B1 | 11/2002 | Pollack et al. |
| 6,490,515 B1 | 12/2002 | Okamura et al. |
| 6,531,951 B2 | 3/2003 | Serban et al. |
| 6,609,054 B2 | 8/2003 | Wallace |
| 6,626,046 B2 | 9/2003 | Taguchi et al. |
| 6,687,523 B1 | 2/2004 | Jayaramen et al. |
| 6,763,320 B2 | 7/2004 | Kimble |
| 6,815,602 B2 | 11/2004 | De Franco |
| 6,822,635 B2 | 11/2004 | Shahoian et al. |
| 6,829,942 B2 | 12/2004 | Yanai et al. |
| 6,964,205 B2 | 11/2005 | Papakostas et al. |
| 7,037,268 B1 | 5/2006 | Sleva et al. |
| 7,066,887 B2 | 6/2006 | Flesch et al. |
| 7,109,068 B2 | 9/2006 | Akram et al. |
| 7,113,856 B2 | 9/2006 | Theiss et al. |
| 7,138,976 B1 | 11/2006 | Bouzit et al. |
| 7,157,640 B2 | 1/2007 | Baggs |
| 7,162,344 B2 | 1/2007 | Kojima et al. |
| 7,302,866 B1 | 12/2007 | Malkin et al. |
| 7,311,009 B2 | 12/2007 | Kotovsky |
| 7,332,670 B2 | 2/2008 | Fujiwara et al. |
| 7,409,256 B2 | 8/2008 | Lin et al. |
| 7,439,465 B2 | 10/2008 | Parkinson |
| 7,483,866 B2 | 1/2009 | Luo |
| 7,493,230 B2 | 2/2009 | Schwartz et al. |
| 7,536,794 B2 | 5/2009 | Hay et al. |
| 7,584,666 B2 | 9/2009 | Kim et al. |
| 7,608,776 B2 | 10/2009 | Ludwig |
| 7,719,007 B2 | 5/2010 | Tompkins et al. |
| 7,726,199 B2 | 6/2010 | Shkel et al. |
| 7,754,956 B2 | 7/2010 | Gain et al. |
| 7,780,541 B2 | 8/2010 | Bauer |
| 7,855,718 B2 | 12/2010 | Westerman |
| 7,928,312 B2 | 4/2011 | Sharma |
| 7,984,544 B2 | 7/2011 | Rosenberg |
| 8,109,149 B2 | 2/2012 | Kotovsky |
| 8,117,922 B2 | 2/2012 | Xia et al. |
| 8,120,232 B2 | 2/2012 | Daniel et al. |
| 8,127,623 B2 | 3/2012 | Son et al. |
| 8,161,826 B1 | 4/2012 | Taylor |
| 8,162,857 B2 | 4/2012 | Lanfermann et al. |
| 8,250,934 B2 | 8/2012 | Sakurai |
| 8,274,485 B2 | 9/2012 | Liu et al. |
| 8,346,684 B2 | 1/2013 | Mirbach et al. |
| 8,368,505 B2 | 2/2013 | Deppiesse et al. |
| 8,448,530 B2 | 5/2013 | Leuenberger et al. |
| 8,479,585 B2 | 7/2013 | Shaw-Klein |
| 8,536,880 B2 | 9/2013 | Philipp |
| 8,571,827 B2 | 10/2013 | Jang et al. |
| 8,587,422 B2 | 11/2013 | Andrews et al. |
| 8,661,917 B2 | 3/2014 | Jheng et al. |
| 8,680,390 B2 | 3/2014 | McMillen et al. |
| 8,813,579 B2 | 8/2014 | Aufrere |
| 8,857,274 B2 | 10/2014 | Mamigonians |
| 8,880,358 B2 | 11/2014 | Cunningham |
| 8,884,913 B2 | 11/2014 | Saynac et al. |
| 8,892,051 B2 | 11/2014 | Yi et al. |
| 8,893,565 B2 | 11/2014 | White et al. |
| 8,904,876 B2 | 12/2014 | Taylor et al. |
| 8,925,392 B2 | 1/2015 | Esposito et al. |
| 8,925,393 B2 | 1/2015 | Cannard et al. |
| 8,928,014 B2 | 1/2015 | Tischler et al. |
| 8,945,328 B2 | 2/2015 | Longinotti-Buitoni et al. |
| 8,947,889 B2 | 2/2015 | Kelley et al. |
| 8,950,265 B2 | 2/2015 | Dunn et al. |
| 8,964,205 B2 | 2/2015 | Shimizu |
| 8,970,513 B2 | 3/2015 | Kwon et al. |
| 9,032,804 B2 | 5/2015 | Granado et al. |
| 9,038,482 B2 | 5/2015 | Xia et al. |
| 9,075,404 B2 | 7/2015 | McMillen et al. |
| 9,076,419 B2 | 7/2015 | McMillen et al. |
| 9,112,058 B2 | 8/2015 | Bao et al. |
| 9,116,569 B2 | 8/2015 | William et al. |
| 9,164,586 B2 | 10/2015 | Zellers et al. |
| 9,182,302 B2 | 11/2015 | Lim et al. |
| 9,271,665 B2 | 3/2016 | Sarrafzadeh et al. |
| 9,413,376 B2 | 8/2016 | Lowe et al. |
| 9,417,693 B2 | 8/2016 | Seth |
| 9,442,614 B2 | 9/2016 | McMillen |
| 9,480,582 B2 | 11/2016 | Lundborg |
| 9,529,433 B2 | 12/2016 | Shankar et al. |
| 9,546,921 B2 | 1/2017 | McMillen et al. |
| 9,582,035 B2 | 2/2017 | Connor |
| 9,612,102 B2 | 4/2017 | Reese et al. |
| 9,652,101 B2 | 5/2017 | McMillen et al. |
| 9,682,856 B2 | 6/2017 | Whitesides et al. |
| 9,696,223 B2 | 7/2017 | Lisseman et al. |
| 9,696,833 B2 | 7/2017 | McMillen |
| 9,710,060 B2 | 7/2017 | McMillen et al. |
| 9,721,553 B2 | 8/2017 | McMillen et al. |
| 9,753,568 B2 | 9/2017 | McMillen |
| 9,756,895 B2 | 9/2017 | Rice et al. |
| 9,827,996 B2 | 11/2017 | McMillen |
| 9,836,151 B2 | 12/2017 | McMillen |
| 9,851,267 B1 | 12/2017 | Ma et al. |
| 9,863,823 B2 | 1/2018 | McMillen |
| 9,891,718 B2 | 2/2018 | Connor |
| 9,965,076 B2 | 5/2018 | McMillen |
| 9,970,832 B2 | 5/2018 | Hong et al. |
| 9,993,921 B2 | 6/2018 | Lessing et al. |
| 10,046,671 B2 | 8/2018 | Seiller et al. |
| 10,076,143 B2 | 9/2018 | Marriott et al. |
| 10,082,381 B2 | 9/2018 | McMillen et al. |
| 10,114,493 B2 | 10/2018 | McMillen et al. |
| 10,268,315 B2 | 4/2019 | McMillen et al. |
| 10,282,011 B2 | 5/2019 | McMillen et al. |
| 10,288,507 B2 | 5/2019 | McMillen et al. |
| 10,352,787 B2 | 7/2019 | McMillen et al. |
| 10,362,989 B2 | 7/2019 | McMillen et al. |
| 10,654,486 B2 | 5/2020 | McMillen et al. |
| 10,753,814 B2 | 8/2020 | McMillen et al. |
| 10,802,641 B2 | 10/2020 | McMillen et al. |
| 2002/0078757 A1 | 6/2002 | Hines et al. |
| 2002/0180578 A1 | 12/2002 | Sandbach |
| 2004/0031180 A1 | 2/2004 | Ivanov |
| 2004/0093746 A1 | 5/2004 | Varsallona |
| 2004/0118619 A1 | 6/2004 | Gray et al. |
| 2004/0183648 A1 | 9/2004 | Weber et al. |
| 2004/0189145 A1 | 9/2004 | Pletner et al. |
| 2004/0249536 A1 | 12/2004 | Hattori |
| 2004/0252007 A1 | 12/2004 | Lussey et al. |
| 2005/0072249 A1 | 4/2005 | Maeda et al. |
| 2005/0109095 A1 | 5/2005 | Sinnett |

(56) References Cited

U.S. PATENT DOCUMENTS

| | | |
|---|---|---|
| 2005/0220673 A1 | 10/2005 | Thaysen |
| 2006/0103192 A1 | 5/2006 | Norton |
| 2006/0150752 A1 | 7/2006 | Lorenz et al. |
| 2006/0192417 A1 | 8/2006 | Ellinger et al. |
| 2006/0209050 A1 | 9/2006 | Serban |
| 2006/0274055 A1 | 12/2006 | Reynolds et al. |
| 2007/0063992 A1 | 3/2007 | Lundquist |
| 2007/0129776 A1 | 6/2007 | Robins et al. |
| 2007/0151348 A1 | 7/2007 | Zdeblick et al. |
| 2007/0188179 A1 | 8/2007 | Deangelis et al. |
| 2007/0188180 A1 | 8/2007 | Deangelis et al. |
| 2007/0202765 A1 | 8/2007 | Krans et al. |
| 2007/0234888 A1 | 10/2007 | Rotolo de Moraes |
| 2008/0046152 A1 | 2/2008 | Ohtake et al. |
| 2008/0069412 A1 | 3/2008 | Champagne et al. |
| 2008/0158145 A1 | 7/2008 | Westerman |
| 2008/0189827 A1 | 8/2008 | Bauer |
| 2008/0254824 A1 | 10/2008 | Moraes |
| 2009/0013793 A1 | 1/2009 | Kim et al. |
| 2009/0049980 A1 | 2/2009 | Sharma |
| 2009/0134966 A1 | 5/2009 | Baker |
| 2009/0237374 A1 | 9/2009 | Li et al. |
| 2009/0272197 A1 | 11/2009 | Granado et al. |
| 2009/0301190 A1 | 12/2009 | Ross, Jr. et al. |
| 2009/0303400 A1 | 12/2009 | Hou et al. |
| 2010/0066572 A1 | 3/2010 | Dietz et al. |
| 2010/0123686 A1 | 5/2010 | Klinghult et al. |
| 2010/0134327 A1 | 6/2010 | Dinh et al. |
| 2010/0149108 A1 | 6/2010 | Hotelling et al. |
| 2010/0179724 A1 | 7/2010 | Weston |
| 2010/0199777 A1 | 8/2010 | Hooper et al. |
| 2010/0242274 A1 | 9/2010 | Rosenfeld et al. |
| 2010/0274447 A1 | 10/2010 | Stumpf |
| 2010/0286951 A1 | 11/2010 | Danenberg et al. |
| 2010/0292945 A1 | 11/2010 | Reynolds et al. |
| 2010/0315337 A1 | 12/2010 | Ferren et al. |
| 2011/0005090 A1 | 1/2011 | Lee et al. |
| 2011/0088535 A1 | 4/2011 | Zarimis |
| 2011/0088536 A1 | 4/2011 | McMillen et al. |
| 2011/0107771 A1 | 5/2011 | Crist et al. |
| 2011/0141052 A1 | 6/2011 | Bernstein et al. |
| 2011/0153261 A1 | 6/2011 | Jang et al. |
| 2011/0199284 A1 | 8/2011 | Davis et al. |
| 2011/0221564 A1 | 9/2011 | Deppiesse et al. |
| 2011/0241850 A1 | 10/2011 | Bosch et al. |
| 2011/0246028 A1 | 10/2011 | Lisseman et al. |
| 2011/0260994 A1 | 10/2011 | Saynac et al. |
| 2011/0271772 A1 | 11/2011 | Parks et al. |
| 2011/0279409 A1 | 11/2011 | Salaverry et al. |
| 2011/0292049 A1 | 12/2011 | Muravsky |
| 2011/0302694 A1 | 12/2011 | Wang et al. |
| 2012/0007831 A1 | 1/2012 | Chang et al. |
| 2012/0024132 A1 | 2/2012 | Wallace et al. |
| 2012/0026124 A1 | 2/2012 | Li et al. |
| 2012/0055257 A1 | 3/2012 | Shaw-Klein |
| 2012/0090408 A1 | 4/2012 | Jheng et al. |
| 2012/0143092 A1 | 6/2012 | Xia et al. |
| 2012/0191554 A1 | 7/2012 | Xia et al. |
| 2012/0197161 A1 | 8/2012 | Xia et al. |
| 2012/0198949 A1 | 8/2012 | Xia et al. |
| 2012/0222498 A1 | 9/2012 | Mamigonians |
| 2012/0234105 A1 | 9/2012 | Taylor |
| 2012/0246795 A1 | 10/2012 | Scheffler et al. |
| 2012/0283979 A1 | 11/2012 | Bruekers et al. |
| 2012/0296528 A1 | 11/2012 | Wellhoefer et al. |
| 2012/0297885 A1 | 11/2012 | Hou et al. |
| 2012/0299127 A1 | 11/2012 | Fujii et al. |
| 2012/0312102 A1 | 12/2012 | Alvarez et al. |
| 2012/0323501 A1 | 12/2012 | Sarrafzadeh et al. |
| 2013/0009905 A1 | 1/2013 | Castillo et al. |
| 2013/0055482 A1 | 3/2013 | D'Aprile et al. |
| 2013/0082970 A1 | 4/2013 | Frey et al. |
| 2013/0085394 A1 | 4/2013 | Corbett, III et al. |
| 2013/0113057 A1 | 5/2013 | Taylor |
| 2013/0113704 A1 | 5/2013 | Sarrafzadeh et al. |
| 2013/0165809 A1 | 6/2013 | Abir |
| 2013/0192071 A1 | 8/2013 | Esposito et al. |
| 2013/0203201 A1 | 8/2013 | Britton et al. |
| 2013/0211208 A1 | 8/2013 | Varadan et al. |
| 2013/0214365 A1 | 8/2013 | Schlarmann et al. |
| 2013/0239787 A1 | 9/2013 | McMillen et al. |
| 2013/0248024 A1 | 9/2013 | Dunn et al. |
| 2013/0274985 A1 | 10/2013 | Lee et al. |
| 2013/0275057 A1 | 10/2013 | Perlin et al. |
| 2013/0327560 A1 | 12/2013 | Ichiki |
| 2013/0340598 A1 | 12/2013 | Marquez et al. |
| 2014/0007704 A1 | 1/2014 | Granado et al. |
| 2014/0007706 A1 | 1/2014 | Aufrere et al. |
| 2014/0013865 A1 | 1/2014 | White et al. |
| 2014/0026678 A1 | 1/2014 | Cannard et al. |
| 2014/0033829 A1 | 2/2014 | Xia et al. |
| 2014/0090488 A1 | 4/2014 | Taylor et al. |
| 2014/0104776 A1 | 4/2014 | Clayton et al. |
| 2014/0104792 A1 | 4/2014 | Jeziorek |
| 2014/0107966 A1 | 4/2014 | Xia et al. |
| 2014/0107967 A1 | 4/2014 | Xia et al. |
| 2014/0107968 A1 | 4/2014 | Xia et al. |
| 2014/0125124 A1 | 5/2014 | Verner |
| 2014/0130593 A1 | 5/2014 | Ciou et al. |
| 2014/0150573 A1 | 6/2014 | Cannard et al. |
| 2014/0182170 A1 | 7/2014 | Wawrousek et al. |
| 2014/0195023 A1 | 7/2014 | Statham et al. |
| 2014/0215684 A1 | 8/2014 | Hardy et al. |
| 2014/0222173 A1 | 8/2014 | Giedwoyn et al. |
| 2014/0222243 A1 | 8/2014 | McMillen et al. |
| 2014/0238153 A1 | 8/2014 | Wood et al. |
| 2014/0240214 A1 | 8/2014 | Liu et al. |
| 2014/0264407 A1 | 9/2014 | Tischler et al. |
| 2014/0318699 A1 | 10/2014 | Longinotti-Buitoni et al. |
| 2014/0347076 A1 | 11/2014 | Barton et al. |
| 2015/0035743 A1 | 2/2015 | Rosener |
| 2015/0084873 A1 | 3/2015 | Hagenbuch et al. |
| 2015/0086955 A1 | 3/2015 | Poniatowski et al. |
| 2015/0130698 A1 | 5/2015 | Burgess |
| 2015/0168238 A1 | 6/2015 | Raut et al. |
| 2015/0177080 A1 | 6/2015 | Esposito et al. |
| 2015/0231991 A1 | 8/2015 | Yetukuri et al. |
| 2015/0248159 A1 | 9/2015 | Luo et al. |
| 2015/0261372 A1 | 9/2015 | McMillen et al. |
| 2015/0316434 A1 | 11/2015 | McMillen et al. |
| 2015/0317964 A1 | 11/2015 | McMillen et al. |
| 2015/0328492 A1 | 11/2015 | Marriott et al. |
| 2015/0330855 A1 | 11/2015 | Daniecki et al. |
| 2015/0331512 A1 | 11/2015 | McMillen et al. |
| 2015/0331522 A1 | 11/2015 | McMillen et al. |
| 2015/0331523 A1 | 11/2015 | McMillen et al. |
| 2015/0331524 A1 | 11/2015 | McMillen et la. |
| 2015/0331533 A1 | 11/2015 | McMillen et al. |
| 2015/0370396 A1 | 12/2015 | Hotelling et al. |
| 2016/0052131 A1 | 2/2016 | Lessing et al. |
| 2016/0054798 A1 | 2/2016 | Messingher et al. |
| 2016/0070347 A1* | 3/2016 | McMillen ............... G06F 3/014 345/173 |
| 2016/0073539 A1 | 3/2016 | Driscoll et al. |
| 2016/0147352 A1 | 5/2016 | Filiz et al. |
| 2016/0162022 A1 | 6/2016 | Seth |
| 2016/0169754 A1 | 6/2016 | Kowalewski et al. |
| 2016/0175186 A1 | 6/2016 | Shadduck |
| 2016/0187973 A1 | 6/2016 | Shankar et al. |
| 2016/0209441 A1 | 7/2016 | Mazzeo et al. |
| 2016/0238547 A1 | 8/2016 | Park et al. |
| 2016/0246369 A1* | 8/2016 | Osman ................. G06F 3/0346 |
| 2016/0252412 A1 | 9/2016 | McMillen et al. |
| 2016/0270727 A1 | 9/2016 | Berg et al. |
| 2016/0278709 A1 | 9/2016 | Granado et al. |
| 2016/0313798 A1 | 10/2016 | Connor |
| 2016/0318356 A1 | 11/2016 | McMillen et al. |
| 2016/0340534 A1 | 11/2016 | Wijesundara et al. |
| 2016/0358849 A1 | 12/2016 | Jur et al. |
| 2016/0375910 A1 | 12/2016 | McMillen et al. |
| 2017/0000369 A1 | 1/2017 | Hyde et al. |
| 2017/0038881 A1 | 2/2017 | McMillen |
| 2017/0056644 A1 | 3/2017 | Chahine et al. |
| 2017/0059426 A1 | 3/2017 | Choi et al. |

(56) References Cited

U.S. PATENT DOCUMENTS

| | | | |
|---|---|---|---|
| 2017/0086519 | A1 | 3/2017 | Vigano et al. |
| 2017/0108929 | A1 | 4/2017 | Sinko et al. |
| 2017/0110103 | A1 | 4/2017 | McMillen et al. |
| 2017/0127736 | A1 | 5/2017 | Roberts et al. |
| 2017/0167931 | A1 | 6/2017 | McMillen et al. |
| 2017/0176267 | A1 | 6/2017 | Keller et al. |
| 2017/0212638 | A1 | 7/2017 | McMillen |
| 2017/0215495 | A1 | 8/2017 | Okumiya et al. |
| 2017/0303853 | A1 | 10/2017 | McMillen et al. |
| 2017/0305301 | A1 | 10/2017 | McMillen et al. |
| 2018/0015932 | A1 | 1/2018 | McMillen et al. |
| 2018/0077976 | A1* | 3/2018 | Keller ............... G06F 3/016 |
| 2018/0094991 | A1 | 4/2018 | McMillen et al. |
| 2018/0263563 | A1 | 9/2018 | McMillen et al. |
| 2019/0034019 | A1 | 1/2019 | McMillen et al. |
| 2019/0219465 | A1 | 7/2019 | McMillen et al. |
| 2020/0150761 | A1* | 5/2020 | Hogbin ............... G06F 3/016 |
| 2020/0200621 | A1 | 6/2020 | McMillen et al. |
| 2020/0292399 | A1 | 9/2020 | McMillen et al. |

FOREIGN PATENT DOCUMENTS

| | | |
|---|---|---|
| CN | 102551728 A | 7/2012 |
| CN | 202396601 U | 8/2012 |
| CN | 203234132 U | 10/2013 |
| CN | 102406280 B | 3/2014 |
| DE | 102 12 023 A1 | 10/2003 |
| DE | 11 2010 004 038 T5 | 9/2012 |
| EP | 0 014 022 B1 | 11/1984 |
| EP | 0 211 984 | 3/1987 |
| EP | 2 682 724 A1 | 1/2014 |
| JP | S47-18925 | 5/1972 |
| JP | H04-011666 A | 1/1992 |
| JP | H06-323929 A | 11/1994 |
| JP | H08-071978 | 3/1996 |
| JP | H08-194481 A | 7/1996 |
| JP | H10-198503 A | 7/1998 |
| JP | 2000-267664 A | 9/2000 |
| JP | 2006-503350 | 1/2006 |
| JP | 2007-503052 A | 2/2007 |
| JP | 2008-515008 A | 5/2008 |
| JP | 2009-543030 A | 12/2009 |
| JP | 2010-503113 A | 1/2010 |
| JP | 2011-502313 A | 1/2011 |
| JP | 2012-521550 A | 9/2012 |
| JP | 2012-220315 A | 11/2012 |
| JP | 2014-077662 A | 5/2014 |
| JP | 2017-518338 | 12/2017 |
| KR | 10-2007-0008500 A | 1/2007 |
| KR | 100865148 B1 | 10/2008 |
| KR | 10-1362742 B1 | 2/2014 |
| KR | 10-2014-0071693 A | 6/2014 |
| NL | 8900820 A | 11/1990 |
| RU | 2 533 539 C1 | 11/2014 |
| WO | WO 99/020179 A1 | 4/1999 |
| WO | WO 2007/024875 A2 | 3/2007 |
| WO | WO 2008/032661 | 3/2008 |
| WO | WO 2009/155891 A1 | 12/2009 |
| WO | WO 2011/047171 A2 | 4/2011 |
| WO | WO 2013/116242 | 8/2013 |
| WO | WO 2013/181474 | 12/2013 |
| WO | WO 2014/058473 | 4/2014 |
| WO | WO 2015/175317 A1 | 11/2015 |
| WO | WO 2016/070078 A1 | 5/2016 |
| WO | WO 2016/138234 A1 | 9/2016 |
| WO | WO 2016/176307 A1 | 11/2016 |
| WO | WO 2016/210173 A1 | 12/2016 |
| WO | WO 2017/066096 A1 | 4/2017 |
| WO | WO 2017/184367 A1 | 10/2017 |

OTHER PUBLICATIONS

U.S. Office Action dated Apr. 15, 2013 issued in U.S. Appl. No. 12/904,657.

U.S. Notice of Allowance dated Nov. 8, 2013 issued in U.S. Appl. No. 12/904,657.

U.S. Office Action dated Mar. 12, 2015 issued in U.S. Appl. No. 14/173,617.

U.S. Notice of Allowance dated May 1, 2015 issued in U.S. Appl. No. 14/173,617.

U.S. Office Action dated Mar. 10, 2016 issued in U.S. Appl. No. 14/727,619.

U.S. Final Office Action dated Jul. 18, 2016 issued in U.S. Appl. No. 14/727,619.

U.S. Notice of Allowance dated Sep. 15, 2016 issued in U.S. Appl. No. 14/727,619.

U.S. Office Action dated Dec. 31, 2018 issued in U.S. Appl. No. 15/374,816.

U.S. Notice of Allowance dated Mar. 11, 2019 issued in U.S. Appl. No. 15/374,816.

U.S. Office Action dated Jan. 10, 2020 issued in U.S. Appl. No. 16/362,017.

U.S. Office Action dated Apr. 2, 2015 issued in U.S. Appl. No. 13/799,304.

U.S. Notice of Allowance dated Apr. 24, 2015 issued in U.S. Appl. No. 13/799,304.

U.S. Office Action dated Sep. 1, 2015 issued in U.S. Appl. No. 14/728,872.

U.S. Final Office Action dated Mar. 9, 2016 issued in U.S. Appl. No. 14/728,872.

U.S. Office Action dated Jun. 22, 2016 issued in U.S. Appl. No. 14/728,872.

U.S. Final Office Action dated Oct. 18, 2016 issued in U.S. Appl. No. 14/728,872.

U.S. Advisory Action dated Feb. 10, 2017 issued in U.S. Appl. No. 14/728,872.

U.S. Office Action dated May 19, 2017 issued in U.S. Appl. No. 14/728,872.

U.S. Notice of Allowance dated Oct. 16, 2017 issued in U.S. Appl. No. 14/728,872.

U.S. Office Action dated Jul. 25, 2016 issued in U.S. Appl. No. 14/728,873.

U.S. Office Action dated Dec. 30, 2016 issued in U.S. Appl. No. 14/728,873.

U.S. Final Office Action dated Mar. 31, 2017 issued in U.S. Appl. No. 14/728,873.

U.S. Advisory Action and Examiner initiated interview summary dated May 26, 2017 issued in U.S. Appl. No. 14/728,873.

U.S. Office Action dated Aug. 25, 2017 issued in U.S. Appl. No. 14/728,873.

U.S. Final Office Action dated Dec. 22, 2017 issued in U.S. Appl. No. 14/728,873.

U.S. Office Action dated Mar. 26, 2018 issued in U.S. Appl. No. 14/728,873.

U.S. Notice of Allowance dated Jul. 19, 2018 issued in U.S. Appl. No. 14/728,873.

U.S. Office Action dated Mar. 9, 2016 issued in U.S. Appl. No. 14/299,976.

U.S. Final Office Action dated Jul. 6, 2016 issued in U.S. Appl. No. 14/299,976.

U.S. Office Action dated Oct. 21, 2016 issued in U.S. Appl. No. 14/299,976.

U.S. Final Office Action dated Apr. 19, 2017 issued in U.S. Appl. No. 14/299,976.

U.S. Final Office Action dated Jun. 8, 2017 issued in U.S. Appl. No. 14/299,976.

U.S. Office Action dated Sep. 1, 2017 issued in U.S. Appl. No. 14/299,976.

U.S. Notice of Allowance dated Feb. 22, 2018 issued in U.S. Appl. No. 14/299,976.

U.S. Office Action dated Jan. 13, 2016 issued in U.S. Appl. No. 14/464,551.

U.S. Notice of Allowance dated Jun. 23, 2016 issued in U.S. Appl. No. 14/464,551.

U.S. Office Action dated Sep. 23, 2016 issued in U.S. Appl. No. 14/800,538.

(56) References Cited

OTHER PUBLICATIONS

U.S. Notice of Allowance dated Jan. 17, 2017 issued in U.S. Appl. No. 14/800,538.
U.S. Office Action dated Jul. 12, 2018 issued in U.S. Appl. No. 15/483,926.
U.S. Notice of Allowance dated Dec. 31, 2018 issued in U.S. Appl. No. 15/483,926.
U.S. Office Action dated Feb. 22, 2017 issued in U.S. Appl. No. 14/671,821.
U.S. Notice of Allowance dated Jul. 3, 2017 issued in U.S. Appl. No. 14/671,821.
U.S. Office Action dated Jun. 30, 2017 issued in U.S. Appl. No. 15/251,772.
U.S. Final Office Action dated Nov. 15, 2017 issued in U.S. Appl. No. 15/251,772.
U.S. Office Action dated Feb. 22, 2018 issued in U.S. Appl. No. 15/251,772.
U.S. Office Action dated Sep. 4, 2018 issued in U.S. Appl. No. 15/251,772.
U.S. Final Office Action dated Dec. 21, 2018 issued in U.S. Appl. No. 15/251,772.
U.S. Notice of Allowance dated Mar. 5, 2019 issued in U.S. Appl. No. 15/251,772.
U.S. Office Action dated Jun. 28, 2016 issued in U.S. Appl. No. 14/671,844.
U.S. Final Office Action dated Nov. 25, 2016 issued in U.S. Appl. No. 14/671,844.
U.S.Notice of Allowance dated Mar. 13, 2017 issued in U.S. Appl. No. 14/671,844.
U.S. Office Action dated Jan. 26, 2017 issued in U.S. Appl. No. 15/052,293.
U.S. Final Office Action dated May 2, 2017 issued in U.S. Appl. No. 15/052,293.
U.S. Notice of Allowance dated May 24, 2017 issued in U.S. Appl. No. 15/052,293.
U.S. Notice of Allowance [Supplemental Notice of Allowability] dated Jun. 20, 2017 issued in U.S. Appl. No. 15/052,293.
U.S. Notice of Allowance dated Sep. 22, 2017 issued in U.S. Appl. No. 15/052,293.
U.S. Notice of Allowance [Supplemental Notice of Allowability] dated Oct. 19, 2017 issued in U.S. Appl. No. 15/052,293.
U.S. Office Action dated Jul. 24, 2018 issued in U.S. Appl. No. 15/835,131.
U.S. Notice of Allowance dated Dec. 4, 2018 issued in U.S. Appl. No. 15/835,131.
U.S. Office Action dated Mar. 6, 2019 issued in U.S. Appl. No. 15/835,131.
U.S. Notice of Allowance dated May 13, 2019 issued in U.S. Appl. No. 15/835,131.
U.S. Office Action dated May 20, 2016 issued in U.S. Appl. No. 14/928,058.
U.S. Final Office Action dated Jan. 6, 2017 issued in U.S. Appl. No. 14/928,058.
U.S. Notice of Allowance dated Mar. 16, 2017 issued in U.S. Appl. No. 14/928,058.
U.S. Office Action dated Aug. 14, 2018 issued in U.S. Appl. No. 15/621,935.
U.S. Final Office Action dated Feb. 14, 2019 issued in U.S. Appl. No. 15/621,935.
U.S. Notice of Allowance dated May 22, 2019 issued in U.S. Appl. No. 15/621,935.
U.S. Supplemental Notice of Allowance dated Jun. 13, 2019 issued in U.S. Appl. No. 15/621,935.
U.S. Office Action dated Oct. 21, 2019 issued in U.S. Appl. No. 15/621,935.
U.S. Office Action dated Nov. 3, 2017 issued in U.S. Appl. No. 15/138,802.
U.S. Final Office Action dated Mar. 1, 2018 issued in U.S. Appl. No. 15/138,802.
U.S. Advisory Action dated May 16, 2018 issued in U.S. Appl. No. 15/138,802.
U.S. Notice of Allowance dated Jul. 3, 2018 issued in U.S. Appl. No. 15/138,802.
U.S. Office Action dated Jun. 23, 2017 issued in U.S. Appl. No. 15/190,089.
U.S. Notice of Allowance dated Aug. 10, 2017 issued in U.S. Appl. No. 15/190,089.
U.S. Office Action dated Dec. 13, 2018 issued in U.S. Appl. No. 15/690,108.
U.S. Office Action dated Jul. 5, 2019 issued in U.S. Appl. No. 15/690,108.
U.S. Notice of Allowance dated Jan. 29, 2020 issued in U.S. Appl. No. 15/690,108.
U.S. Office Action dated May 24, 2019 issued in U.S. Appl. No. 15/479,103.
U.S. Final Office Action dated Sep. 20, 2019 issued in U.S. Appl. No. 15/479,103.
U.S. Office Action dated Dec. 27, 2016 issued in U.S. Appl. No. 15/287,520.
U.S. Notice of Allowance dated Mar. 27, 2017 issued in U.S. Appl. No. 15/287,520.
PCT International Search Report dated May 27, 2011, issued in PCT/US2010/052701.
PCT International Preliminary Report on Patentability and Written Opinion dated Apr. 26, 2012, issued in PCT/US2010/052701.
Japanese Office Action dated Feb. 25, 2014 issued in JP 2012-534361.
PCT International Search Report and Written Opinion dated Sep. 3, 2015 issued in PCT/US2015/029732.
PCT International Preliminary Report on Patentability and Written Opinion dated Nov. 24, 2016 issued in PCT/US2015/029732.
Japanese Office Action dated Dec. 4, 2018 issued in JP 2016-566814.
PCT International Search Report and Written Opinion dated May 26, 2016 issued in PCT/US2016/019513.
PCT International Preliminary Report on Patentability and Written Opinion dated Sep. 8, 2017 issued in PCT/US2016/019513.
Japanese Office Action dated Jul. 30, 2019 issued in JP 2017-518338.
Japanese Office Action dated Jul. 9, 2019 issued in JP 2018-114012.
PCT International Search Report and Written Opinion dated Apr. 14, 2016 issued in PCT/US2015/058370.
PCT International Preliminary Report on Patentability and Written Opinion dated May 11, 2017 issued in PCT/US2015/058370.
PCT International Search Report and Written Opinion dated Nov. 8, 2018 issued in PCT/US2018/035848.
PCT International Preliminary Report on Patentability and Written Opinion dated Dec. 26, 2019 issued in PCT/US2018/035848.
PCT International Search Report and Written Opinion dated Sep. 15, 2016 issued in PCT/US2016/029528.
PCT International Preliminary Report on Patentability and Written Opinion dated Oct. 31, 2017 issued in PCT/US2016/029528.
PCT International Search Report and Written Opinion dated Sep. 29, 2016 issued in PCT/US2016/039089.
PCT International Preliminary Report on Patentability and Written Opinion dated Dec. 26, 2017 issued in PCT/US2016/039089.
PCT International Search Report and Written Opinion dated Jan. 19, 2017 issued in PCT/US2016/055997.
PCT International Preliminary Report on Patentability and Written Opinion dated Apr. 26, 2018 issued in PCT/US2016/055997.
PCT International Search Report and Written Opinion dated Aug. 14, 2017 issued in PCT/US2017/026812.
PCT International Preliminary Report on Patentability dated Nov. 1, 2018 issued in PCT/US2017/026812.
"Electronic Foot Size Measuring Devices," Sensatech Research Ltd., Custom Electronic Sensing Solutions, Registered Office: 4 Heath Square, Boltro Road, Haywards Heath, RH16 1BL Company Registration No. 4524018 Cardiff [retrieved at http:www.electronicsarena.co.uk/companies/sensatech-research/products/electronic-foot-size-measureing-devices on Sep. 17, 2015], 3 pages.
"iStep® Digital Foot Scan," (© 2002-2015) [retrieved at http://www.foot.com/site/iStep on Sep. 17, 2015], 1 page.

(56) References Cited

OTHER PUBLICATIONS

"Podotech Elftman," and Podotech Elftman Brochure (UK Version) [retrieved at http://www.podotech.com/diagnostics/podotech-elftman-2/ on Sep. 17, 2015] podo+tech®, Foot Care Technology Solutions, 7 pages.

Roh, Jung-Sim et al. (2011) "Robust and reliable fabric and piezoresistive multitouch sensing surfaces for musical controllers," from Alexander Refsum Jensenius, Recorded at: 11th International Conference on New Interfaces for Musical Expression May 30-Jun. 1, 2011, Oslo, Norway, a vimeo download at http://vimeo.com/26906580.

"The Emed®-Systems," [retrieved at http://www.novel.de/novelcontent/emed on Sep. 17, 2015] novel.de, 4 pages.

U.S. Appl. No. 15/630,840, filed Jun. 22, 2017, McMillen et al.

U.S. Appl. No. 16/692,626, filed Nov. 22, 2019, Lacy et al.

U.S. Notice of Allowance dated May 13, 2020 issued in U.S. Appl. No. 16/362,017.

U.S. Office Action dated Mar. 19, 2020 issued in U.S. Appl. No. 14/728,873.

U.S. Notice of Allowance dated Jun. 15, 2020 issued in U.S. Appl. No. 14/728,873.

U.S. Final Office Action dated Apr. 28, 2020 issued in U.S. Appl. No. 15/621,935.

U.S. Office Action dated Jul. 13, 2020 issued in U.S. Appl. No. 15/621,935.

Japanese Office Action dated May 22, 2020 issued in JP 2017-518338.

Japanese Office Action dated Apr. 22, 2020 issued in JP 2018-114012.

Japanese Office Action dated Aug. 17, 2020 issued in JP 2018-114012.

U.S. Appl. No. 16/806,297, filed Mar. 2, 2020, McMillen.

U.S. Appl. No. 16/947,140, filed Jul. 20, 2020, McMillen et al.

U.S. Appl. No. 16/948,131, filed Sep. 3, 2020, McMillen et al.

\* cited by examiner

1: 11mm x 15mm Coil Magnet Assembly
2: 3M 467MP PSA
3: Copper Reaction Mass (27 mil)
4: 3M 468MP PSA
5: Plastic Mass Cover

ONE-SIZE-FITS-ALL DATA GLOVE

INCORPORATION BY REFERENCE

An Application Data Sheet is filed concurrently with this specification as part of this application. Each application to which this application claims benefit or priority as identified in the concurrently filed Application Data Sheet is incorporated by reference herein in its entirety and for all purposes.

BACKGROUND

Demand is rapidly rising for technologies that bridge the gap between computing devices and the physical world. Such interfaces typically require some form of sensor technology that translates information from the physical domain to the digital domain. One type of interface provides for the translation of the movements of a human operator, as well as forces exerted or experienced by the human operator, to digital information.

SUMMARY

According to a particular class of implementations, an apparatus includes a sensor assembly including a plurality of digit sensor assemblies. Each digit sensor assembly including one or more sensors on an elongated substrate. The one or more sensors of each digit sensor assembly is configured to generate one or more signals representing bending of the corresponding substrate. A textile assembly includes a plurality of digit textile assemblies. Each digit textile assembly is configured to align with a corresponding finger of a hand and includes a fingertip portion for securing the digit textile assembly to a fingertip of the corresponding finger. Each digit textile assembly also includes a sleeve in which a corresponding one of the digit sensor assemblies is contained. The sleeve is connected at a first end of the sleeve to the fingertip portion of the digit textile assembly and is configured to align the corresponding digit sensor assembly with a back side of the corresponding finger. The textile assembly is configured such that a middle portion of each finger is exposed. A base assembly is connected to each of the sleeves of the digit textile assemblies at a second end of the sleeve opposing the first end. The base assembly is configured to secure the apparatus to the hand. Sensor circuitry configured to receive the signals from the digit sensor assemblies and to generate digital representations of the signals.

According to a specific implementation, each digit sensor assembly is secured in the corresponding sleeve such that the digit sensor assembly slides relative to the sleeve when the digit sensor assembly bends.

According to another specific implementation, each sleeve comprises an elastic fabric.

According to another specific implementation, the apparatus includes a plurality of haptic devices. Each haptic device is integrated with the fingertip portion of a corresponding one of the digit textile assemblies. According to a more specific implementation, each sleeve includes a first chamber in which the corresponding digit sensor assembly is contained, and a second chamber in which one or more conductors connected to the haptic device of the corresponding fingertip portion are contained.

According to another specific implementation, each of the sleeves includes friction material on an outside surface of the sleeve configured for contacting the back side of the corresponding finger.

According to another specific implementation, each digit sensor assembly includes at least two sensors. Each of the sensors is configured to align with a corresponding knuckle of the corresponding finger.

According to another specific implementation, each digit sensor assembly includes one or more stiffeners, Each stiffener is aligned with a corresponding one of the one or more sensors of the digit sensor assembly and is configured to support a particular dynamic range of the corresponding sensor.

According to another specific implementation, each sleeve includes one or more stiffeners. Each stiffener is aligned with a corresponding one of the one or more sensors of the digit sensor assembly contained in the sleeve and is configured to support a particular dynamic range of the corresponding sensor.

According to another specific implementation, each of the one or more sensors of each digit sensor assembly includes either a piezoresistive material or a piezoelectric material.

According to another specific implementation, the base assembly is configured to secure the apparatus to the hand with a strap. The strap has a haptic device integrated therewith such that, when the apparatus is secured to the hand with the strap, the haptic device is aligned with a palm of the hand.

According to another class of implementations, a glove includes a glove body configured to be secured to a human hand and a plurality of finger components extending from the glove body. Each finger component is configured to enclose at least a portion of a corresponding finger of the human hand. Each finger component has a haptic device integrated therewith. The glove also includes circuitry configured to control the haptic devices. The circuitry includes one or more class D amplifiers configured to drive the haptic devices, memory configured to store one or more waveform files, and a controller configured to control the one or more class D amplifiers using the one or more waveform files.

According to a specific implementation, the one or more waveform files are a plurality of waveform files stored in the memory, and the controller is configured to use each of the waveform files with each of the haptic devices.

According to another specific implementation, the controller is configured to control the one or more class D amplifiers using the one or more waveform files according to a control protocol. The control protocol corresponds to one of the Musical Instrument Digital Interface (MIDI) protocol, the MIDI Polyphonic Expression (MPE) protocol, or the Open Sound Control (OSC) protocol. According to a more specific implementation, each of the haptic devices corresponds to a different channel in the control protocol.

According to another specific implementation, the controller is configured to control the one or more class D amplifiers by one or more of sampling, scrubbing, or playing back the one or more waveform files.

According to another specific implementation, the glove also includes a wireless interface configured to stream the one or more waveform files from a remote device in real time.

According to another specific implementation, each of the one or more waveform files is configured for simulation of a corresponding sensory effect.

According to another specific implementation, control of the one or more class D amplifiers by the controller is characterized by an amplitude and a frequency, and the controller is configured to modify the amplitude and the frequency in real time.

According to another specific implementation, each of the one or more waveform files is characterized by a timeline, and the controller is configured to control the one or more class D amplifiers by traversing each of the one or more waveform files backward and forward relative to the corresponding timeline.

According to another specific implementation, control of the one or more class D amplifiers by the controller is characterized by spectral brightness, and the controller is configured to modify the spectral brightness in real time.

According to another specific implementation, control of the one or more class D amplifiers by the controller is characterized by one or more signal parameters, and the controller is configured to modify the one or more signal parameters in real time in response to input representing objects or surfaces in a virtual or real environment.

According to another specific implementation, the controller is configured to control the one or more class D amplifiers using a first waveform file to drive a first haptic device and a second haptic device. The driving of the first haptic device is temporally offset from the driving of the second haptic device to simulate a spatial relationship.

According to another specific implementation, the controller is configured to control the one or more class D amplifiers using the one or more waveforms files in a sequence that represents a haptic gesture.

A further understanding of the nature and advantages of various implementations may be realized by reference to the remaining portions of the specification and the drawings.

DESCRIPTION OF SPECIFIC IMPLEMENTATIONS

Reference will now be made in detail to specific implementations. Examples of these implementations are illustrated in the accompanying drawings. It should be noted that these examples are described for illustrative purposes and are not intended to limit the scope of this disclosure. Rather, alternatives, modifications, and equivalents of the described implementations are included within the scope of this disclosure. In addition, specific details may be provided in order to promote a thorough understanding of the described implementations. Some implementations within the scope of this disclosure may be practiced without some or all of these details. Further, well known features may not have been described in detail for the sake of clarity.

Figure 1A:
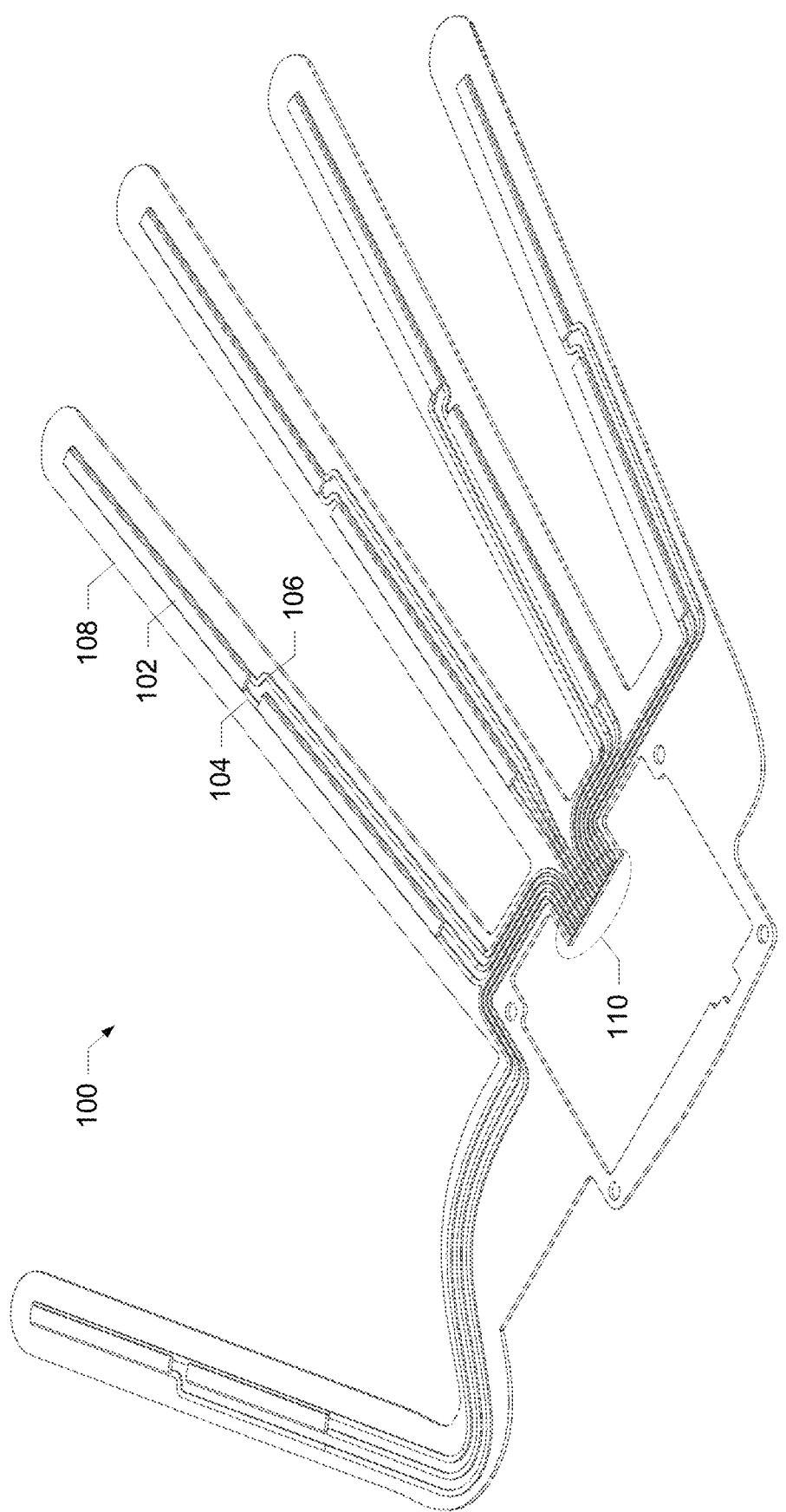
FIG. 1A is a perspective view of an example of sensor assembly for use with implementations enabled by the present disclosure.

U.S. Patent Publication No. 2017/0303853 (U.S. patent application Ser. No. 15/621,935) entitled Sensor System Integrated With a Glove (the entirety of which is incorporated herein by reference for all purposes) describes various implementations of sensor assemblies that are compatible with implementations of a "one-size-fits-all" data glove enabled by the present disclosure. See, for example, the implementation described with reference to FIGS. 12-14C of that publication. A particular implementation of a sensor assembly 100 is depicted in FIG. 1A of the present application. The depicted sensor assembly may be implemented similarly to the implementation depicted in FIGS. 12-14C of the publication incorporated by reference above with the exception that the pads and conductors for haptic devices are not included on the substrate with the knuckle bend sensors. As discussed below, the pads and conductors for the haptics, if included, may be routed separately.

As shown in FIG. 1A, each knuckle bend sensor includes a strip of piezoresistive fabric (e.g., 102) in contact with a pair of conductive traces (e.g., 104 and 106) on a substrate 108. Substrate 108 may be, for example, a polyethylene terephthalate (PET) substrate. The conductive traces are routed along substrate 108 and are connected at edge 110 to a printed circuit board or PCB (not shown) on which the sensor circuitry of the glove is located. It should be noted that sensor assembly 100 is merely one example of a sensor assembly that may be used in connection with a data glove enabled by the present disclosure, and that other types of force sensing technology including a wide range of other sensor types (e.g., other piezoresistive materials, piezoelectric materials, etc.) may be used without departing from the scope of the present disclosure.

Figure 1B:
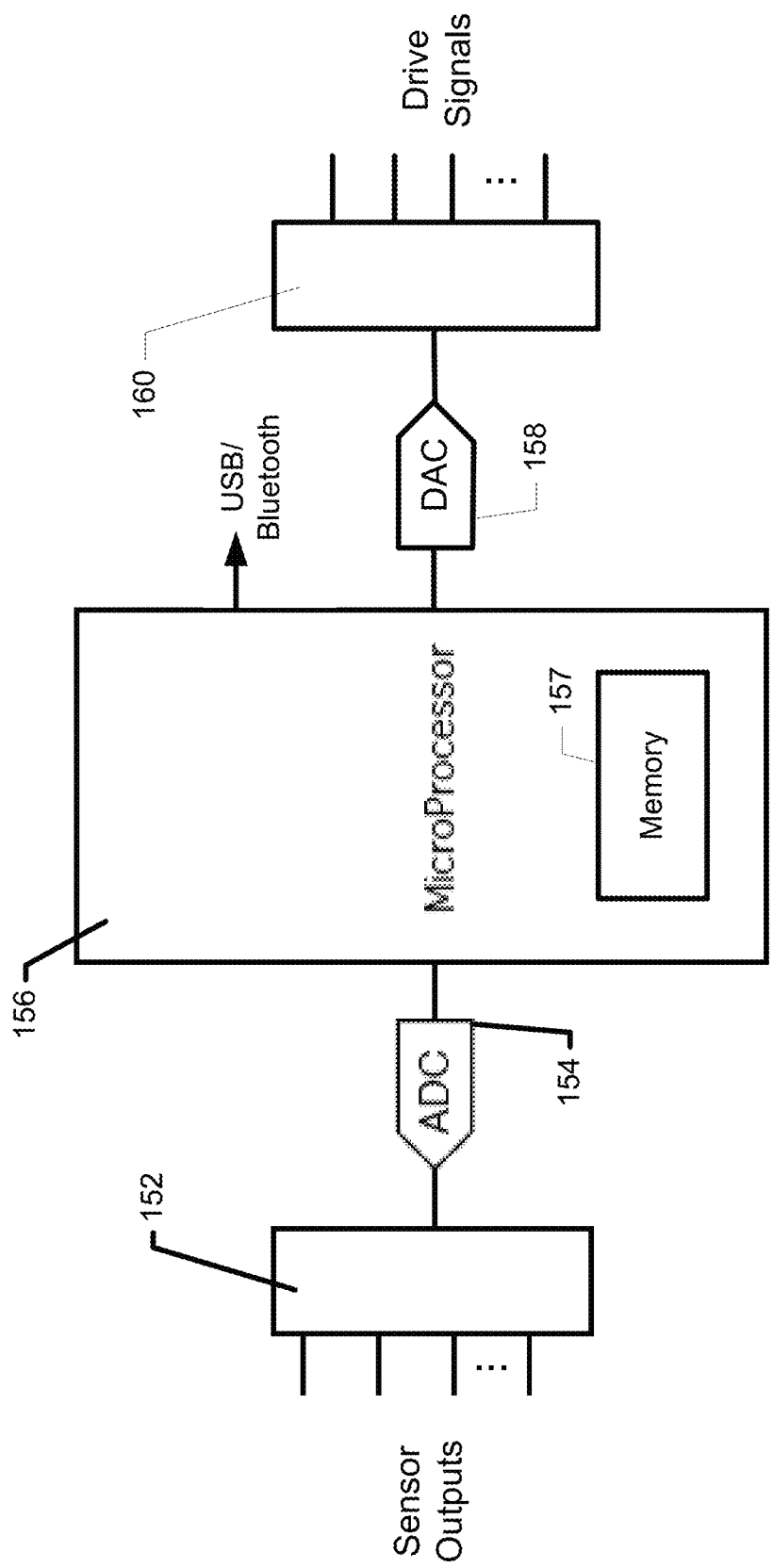
FIG. 1B is a simplified block diagram of sensor circuitry suitable for use with various implementations enabled by the present disclosure.

FIG. 1B is a simplified diagram of sensor circuitry that may be provided on a PCB for use with implementations described herein. For example, in the sensor assembly described above with reference to FIG. 1A, such sensor circuitry could be connected to the conductive traces at edge 110. When pressure is applied to one of the sensors, a resulting signal (captured via the corresponding traces) is received and digitized (e.g., via multiplexer 152 and A-to-D converter 154) and may be processed locally (e.g., by processor 156) and/or transmitted to a connected device (e.g., via a USB or Bluetooth connection). The sensors may be selectively energized by the sensor circuitry (e.g., under the control of processor 156 via D-to-A converter 158 and multiplexer 160) to effect the generation of the sensor signals.

In addition to transmission of data to and from a connected device, power may be provided to the sensor circuitry via a USB connection. Alternatively, systems that transmit data wirelessly (e.g., via Bluetooth) may provide power to the sensor circuitry using any of a variety of mechanisms and techniques including, for example, using one or more batteries, solar cells, and/or mechanisms that harvest mechanical energy. The LTC3588 (provided by Linear Technology Corporation of Milpitas, Calif.) is an example of an energy harvesting power supply that may be used with at least some of these diverse energy sources. Other suitable variations will be appreciated by those of skill in the art. And as will be appreciated, the sensor circuitry shown in FIG. 1B is merely an example. A wide range of sensor circuitry components, configurations, and functionalities are contemplated. An example of a device suitable for implementing processor 156 is the C8051F380-GM controller provided by Silicon Labs of Austin, Tex.

As will be understood, the responses of the sensors in arrays suitable for use with implementations enabled by the present disclosure may exhibit variation relative to each other. Therefore, calibrated sensor data may be stored (e.g., in memory 157 of processor 156) representing the response of each of the sensors. Such data may be used for ensuring consistency in the way the sensor outputs are processed and/or used to represent applied forces. During calibration, the output of each sensor (e.g., as captured by ADC 154) is measured for a range of known input forces. This may be done, for example, by placing each sensor on a scale, applying force to that sensor, and recording a value in memory for each of a plurality of ADC values that represents a corresponding value reported by the scale. In this way, a set of data points for each sensor is captured (e.g., in a table in memory 157) associating ADC values with corresponding forces (e.g., weights in grams or kilograms). The data set for each sensor may capture a force value for every possible value of the ADC output. Alternatively, fewer data points may be captured and the sensor circuitry may use interpolation to derive force values for ADC outputs not represented in the data set.

Glove Textile Design

Figure 2:
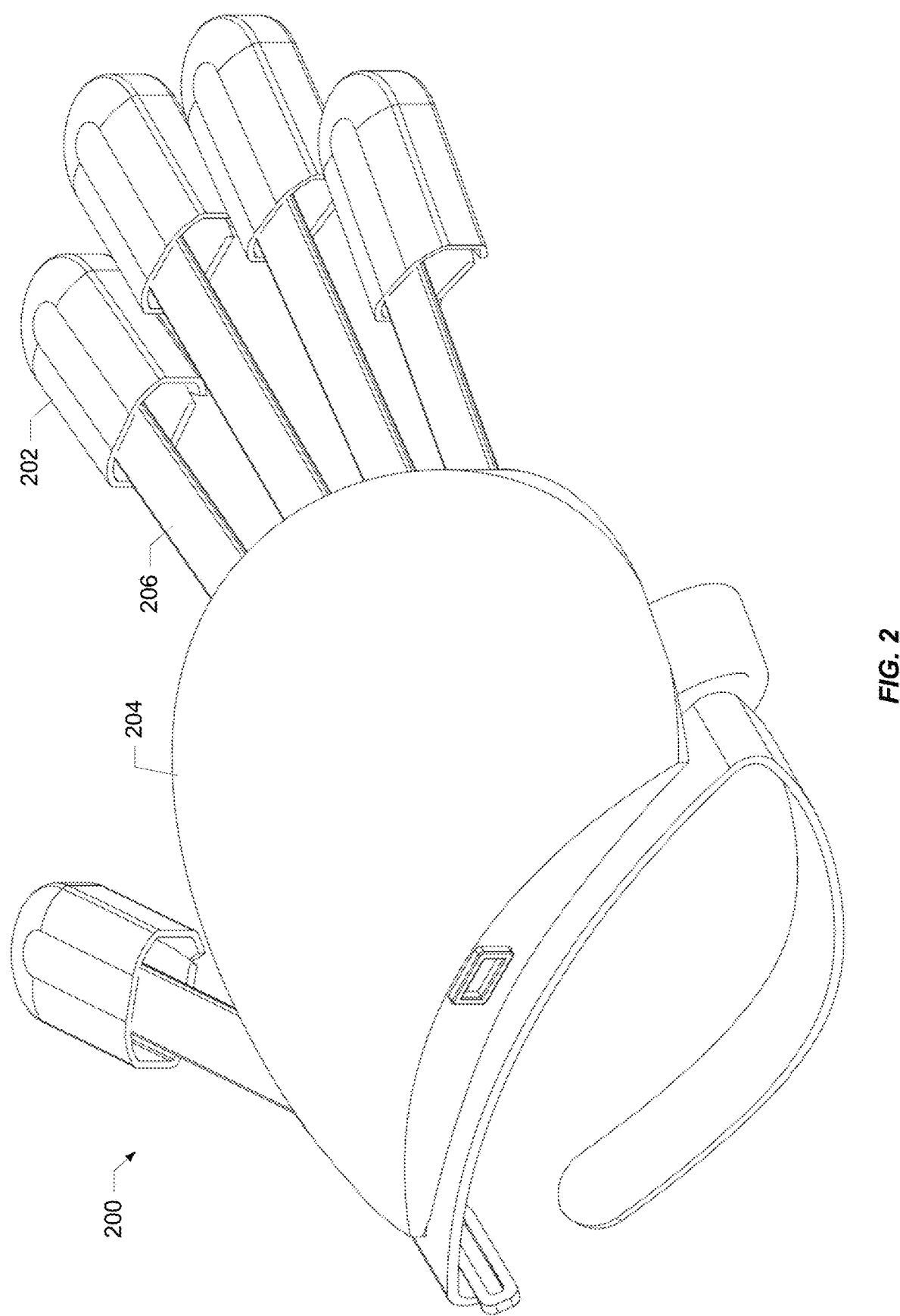
FIGS. 2 and 3 are two different perspective views of an apparatus for use with a human hand as enabled by the present disclosure.
Figure 3:
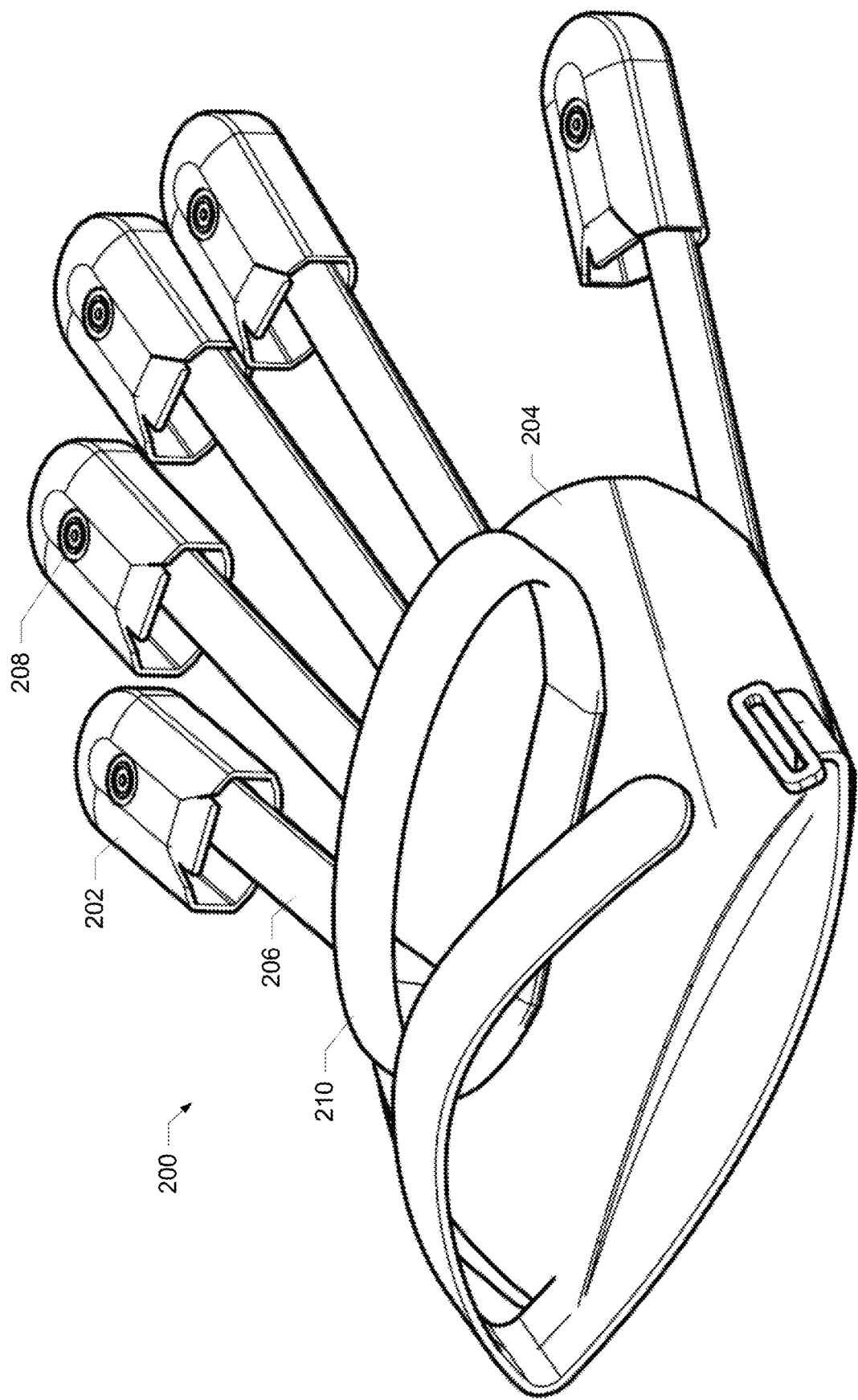

As shown in the perspective views of FIGS. 2 and 3, a data glove 200 is designed in a way that omits much of the material of a conventional full-fingered glove from around the finger. The design includes fingertip covers 202 connected to the main body 204 of the glove by sleeves 206 that ride along the back of each finger in which the portion of the sensor assembly (e.g., sensor assembly 100 of FIG. 1A) for that finger (also referred to as a digit assembly) is situated.

Each sleeve is constructed using a stretchable material that allows for bending of the finger. In addition, the longitudinal stretching of each sleeve enables the ability to fit a wide range of finger lengths, giving data glove 200 its "one-size-fits-all" character. According to a particular implementation, the primary fabric of most of the textile portions of the glove is a neoprene-type material and the finger sleeves are constructed using a type of spandex that allows for adequate stretch. Providing the sleeve only along one side of the finger also allows the glove to accommodate a wide range of finger widths.

In some implementations, one or more stiffeners (not shown) are integrated with the sleeves and/or the sensor assemblies to enhance knuckle sensor operation by achieving a desired dynamic range for each sensor. These stiffeners may be implemented in a variety of ways. For example, the thickness of the PET substrate of the digit assemblies may be selectively controlled to achieve the desired dynamic range. Alternatively, additional material may be introduced that is aligned with and/or in the vicinity of each sensor to achieve the desired dynamic range. This might take the form of one or more pieces of such stiffening material aligned with each sensor that is integrated with the digit assembly (on either side) or even the sleeve material. For example, stiffening material (e.g., PET strips) may be coupled to the digit assemblies in alignment with each of the knuckle sensors. According to one such implementation, PET strips are affixed to the piezoresistive fabric strips (e.g., strips 102 in FIG. 1A) on the other side of the piezo strips from the side that is in contact with the corresponding pair of conductive traces (e.g., 104 and 106). Alternatively, the stiffening material may be another piece of fabric aligned with each sensor and attached to the sensor substrate or the glove fabric. As yet another alternative, a stiffening material such as, for example, a dielectric ink may be silk-screened or printed on the flexible substrate, on the piezoresistive strips, or the glove fabric in the vicinity of each sensor.

Figure 4:
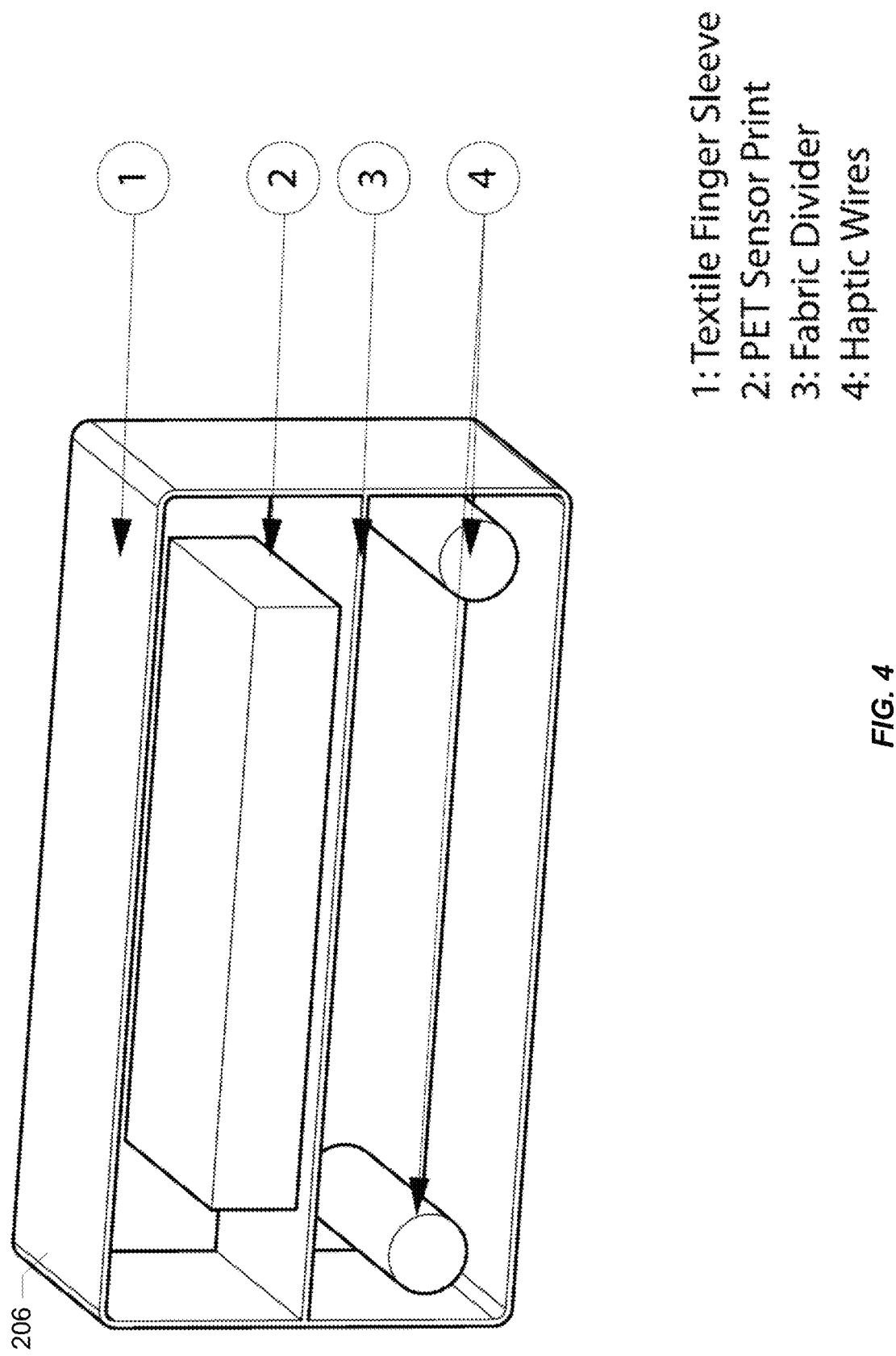
FIG. 4 is a cross-sectional view of sleeve for enclosing components associated with an apparatus enabled by the present disclosure.

According to a particular implementation illustrated by the cross-sectional view of FIG. 4, sleeve 206 includes one chamber for that finger's portion of the digit assembly (e.g., the PET sensor print) and another chamber for the routing of wires (e.g., haptic wires) to haptic devices at the fingertips. Each digit assembly slides relatively freely in its sleeve. This may be important for some applications in that, when the finger is bent and then straightened, if the exterior fabric is slow to release, the pressure registered on the sensor may lag the finger movement in an unacceptable way. The second chamber allows for routing of the haptic wiring in a way that does not interfere with the freedom of movement of the digit assembly relative to its chamber.

According to some implementations, silicone rails (not shown) may be provided on the underside of the sleeve (adjacent the finger) to help keep the sleeve and its digit assembly aligned with the underlying finger. The stiffness of the PET in the digit assemblies may also be adjusted to ensure the desired level of flexibility as well as durability, i.e., so they can handle many bends without fatiguing.

As shown in FIG. 3, grip-enhancing features 208 may be provided at the fingertips. Such features (which may be, for example, friction TPU or screened silicone) are shown in this example to be circular and concentric but a wide variety of shapes and patterns are contemplated.

According to some implementations, leaving out the material that typically surrounds each finger in a conventional glove design provides mechanical isolation of each finger, thereby reducing cross-talk between the sensors of the different fingers. That is, movement of a finger in a conventional glove stretches or distorts the fabric associated with adjacent and even more remote fingers causing any sensors associated with those other fingers to register force. Reducing the fabric as described herein isolates each digit and correspondingly reduces the transmission of forces between fingers.

It should be noted that, while the design described herein is not shown as including abduction sensors between fingers (i.e., sensors that generate signals representing the fingers being spread apart), designs are contemplated in which such sensors are included. It should also be noted that the term "one-size-fits-all" contemplates the fact that, while most human hands can be accommodated by the glove designs described herein, there are outliers (both large and small) that may not be accommodated.

Some knuckle sensor implementations may not be able to distinguish between the bending of a knuckle and a hyperextension of that knuckle, i.e., the bend sensor signal may not indicate the direction of the bend. Providing each digit assembly in a sleeve aligned with the back of the finger may address this issue at least in part because, when the finger is hyperextended, the sleeve and the digit assembly sliding inside that sleeve lift off the finger with the result that the digit assembly remains substantially flat. Therefore, when a sufficiently strong bend signal is actually registered by one or more of the sensors of a digit assembly, there can be a high degree of confidence that the signal represents a bend of the finger rather than a hyperextension.

Haptic Devices

Figure 5:
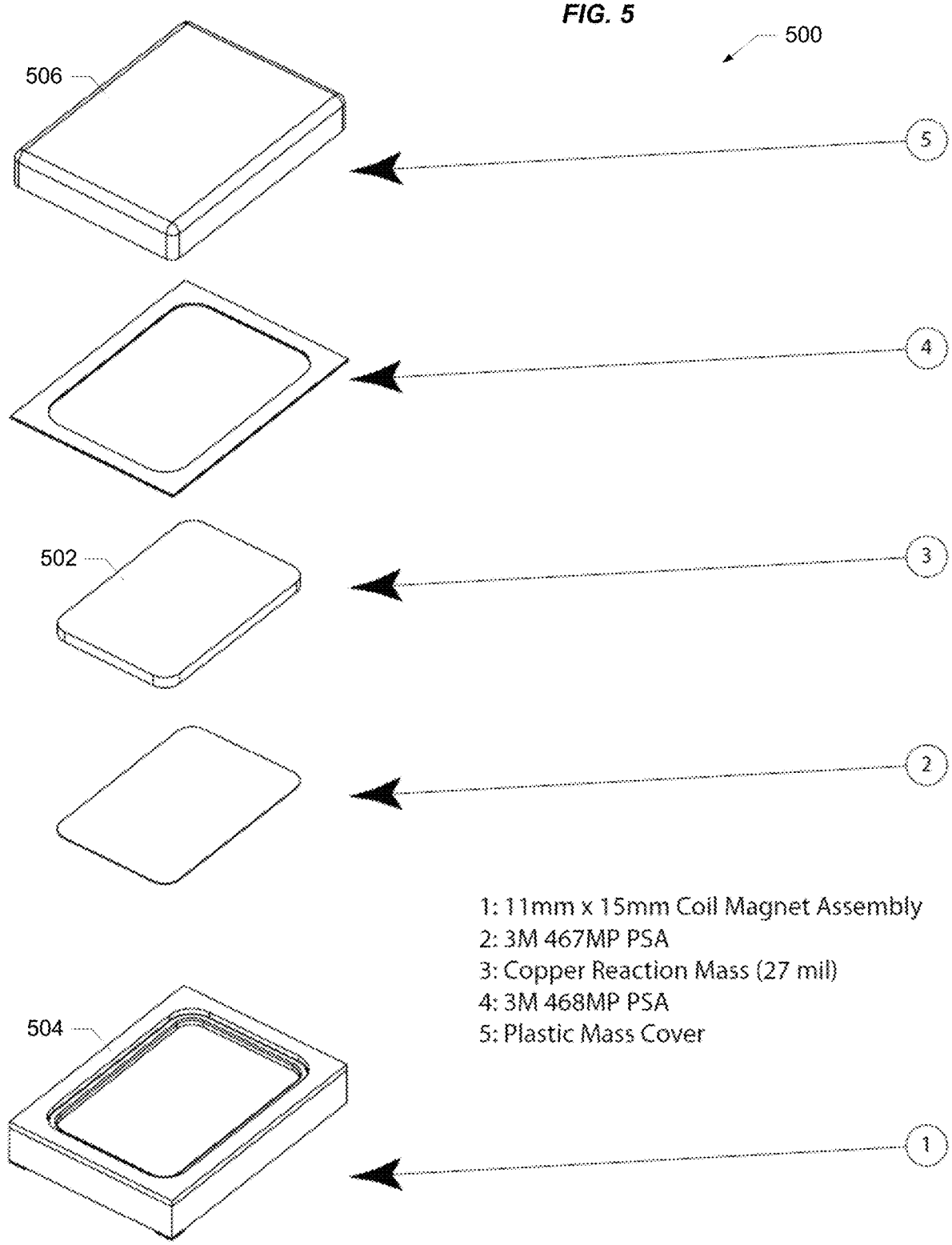
FIG. 5 is an exploded view of a haptic device for use with apparatus enabled by the present disclosure.

Haptic devices may be provided (e.g., at each of the fingertips and the palm) to simulate various sensory experiences. As shown in the exploded view of FIG. 5, haptic device 500 may be an electromagnetic haptic device that includes a reaction mass 502 sitting on top of a coil-magnet assembly 504. The device includes a plastic cover 506 that, with assembly 504, forms a cavity in which reaction mass 502 vibrates. According to a particular implementation, the reaction mass is a copper plate on a Mylar diaphragm in an enclosure that allows it freedom of movement. When the device is driven, the mass moves up and down causing vibration that is sensed by the fingertip or palm.

Figure 6:
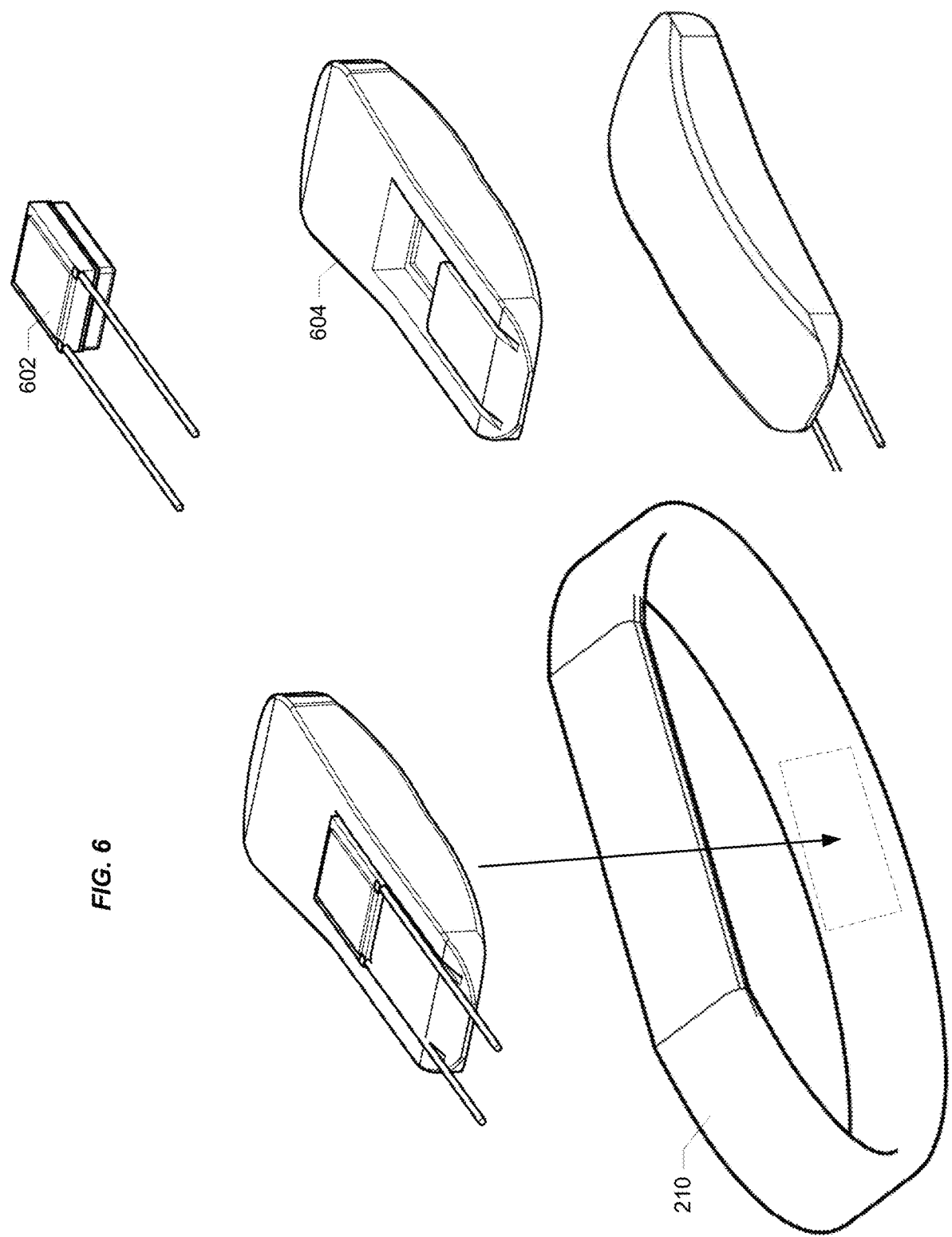
FIG. 6 includes various views of an assembly incorporating a haptic device enabled by the present disclosure.

Some implementations include a palm haptic that fits in the palm of the glove. As shown in FIG. 6, the palm haptic 602 is mounted in a molded plastic component 604 that conforms to the palm and is included (as indicated by the dashed line) in the strap 210 that secures the main body of the glove to the hand.

Figure 7:
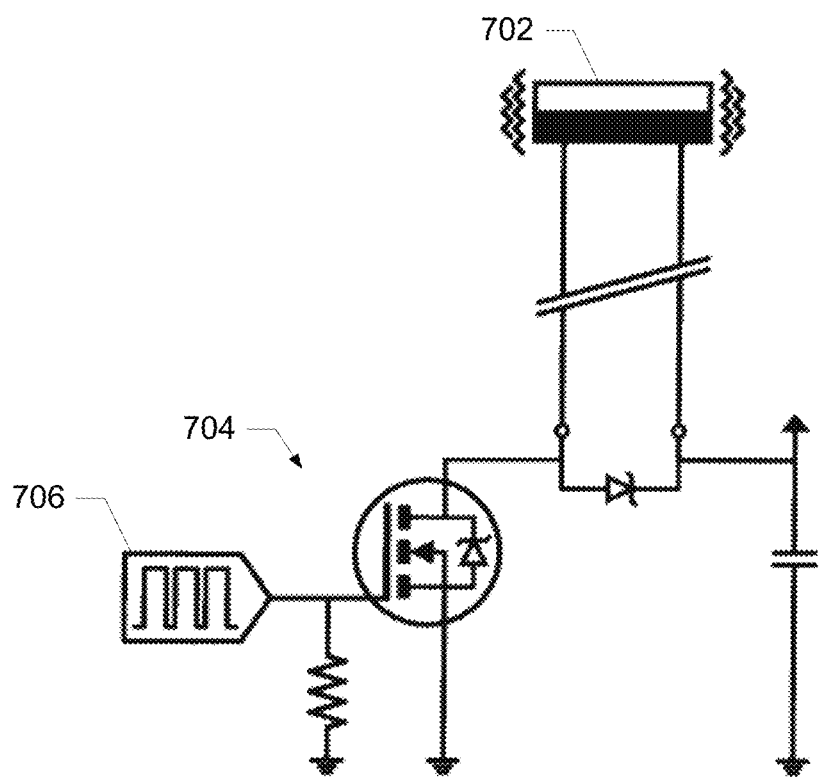
FIG. 7 is a schematic diagram of circuitry for use with a haptic device enabled by the present disclosure.

According to a particular implementation depicted in FIG. 7, each haptic 702 is driven by a simple class D amplifier 704 using any of a library of waveform files 706 stored in the onboard sensor circuitry and shared among the haptic devices. The depicted example represents a pulse width modulation DAC that drives a FET; a simple and inexpensive solution. In some cases, pre-distortion of the waveform files may be introduced to cancel at least a portion of the distortion caused by the amplifier circuit.

According to some implementations, the glove behaves like a synthesizer, sampler, and/or playback device using a corresponding control protocol, e.g. Musical Instrument Digital Interface (MIDI), MIDI Polyphonic Expression (MPE), Open Sound Control (OSC), or a custom specification. Such a system is referred to herein as a Haptic Engine. A Haptic Engine may be configured and used in a variety of ways. Waveform files can be uploaded into the engine and sampled, scrubbed, or played back. Oscillators and synthesis techniques may also be used. Waveforms signals may also be streamed from a host device connected to the glove. Such modes of operation may be adjustable in real-time via the control protocol.

A suitable API or control protocol may operate like a MIDI synthesizer sampler. Multiple different "notes" or commands may be provided per finger to simulate different actions, e.g., a short signal to simulate tapping of a fingertip, or a sustained signal to simulate dragging of a fingertip across a surface. For each fingertip haptic, the sensor circuitry generates a "note on" signal with amplitude and frequency attributes depending on what is being simulated. In this mode of operation, amplitude and frequency can be adjusted in real time via the control protocol to add continuous variations. New libraries of waveform files can be uploaded to the glove (e.g., via Bluetooth or USB), e.g., for use with a new game.

Different waveform synthesis techniques may be mapped to different sets of activities. For example, a waveform file can be scrubbed or traversed in both directions to simulate changing direction when dragging a fingertip across a virtual surface. In another example, as a fingertip is getting close to something in the virtual space, the vibration could get brighter spectrally. The output generated for a given file can be modified (e.g., frequency, amplitude, etc.) depending on input representing characteristics of the objects or surfaces in the virtual environment with which the user is interacting. For example, if the user immerses his virtual hand in virtual water, that information might be used to modify the subsequent playback of waveform files or synthesis to account for the "wetness" of the fingertips.

Each of the haptic devices (fingertips and palm) may be treated as a unique channel in which a different "track" is played for each haptic, i.e., multi-channel playback and control of the array of haptic devices. Playback of the tracks may also be spatially related. For example, for a given texture, there might only be one waveform for sustained contact that is played back for each fingertip, but playback for the respective fingertips may be spatially offset so that if, for example, there is a localized irregularity on the virtual surface, one fingertip might "experience" the irregularity before another as the hand moves across the surface.

Additionally, the waveforms produced by the Haptic Engine may be used to trigger and control "haptic gestures" consisting of waveforms or sequences of waveforms across the array of haptic devices, analogous to audio sound effects generated by a computer operating system upon certain events. These haptic gestures or signifiers, for example, may be associated with certain events in gameplay or other applications, such as typing on a virtual keyboard, picking up or putting down objects, etc., and may not necessarily represent a simulation of a "real" experience.

According to some implementations, a waveform file may be generated using a piezo-based pickup mounted in a silicone fingertip constructed to mimic the density of a human fingertip. The fingertip may be engaged in various forms of contact (e.g., tapping or rubbing) with one or more surfaces having different textures to generate waveform files. The waveform files generated this way may be downsampled (because humans typically can't feel above 2 kHz) using a 4 kHz sampling rate, as well as normalized for signal level.

Glove Translation

According to some implementations, mechanisms are provided that enable determining the position and movements of the glove in the real world and mapping those to a virtual environment or another context in the real world. An inertial measurement unit (IMU) on the assembly's PCB measures pitch, roll, and yaw of the glove. The IMU includes an accelerometer, a gyroscope, and a magnetometer, and performs sensor fusion to generate the pitch, roll, and yaw. In addition, a double integration of the raw accelerometer output is used to get dead reckoning information.

Fiducial Tracking

Figure 8:
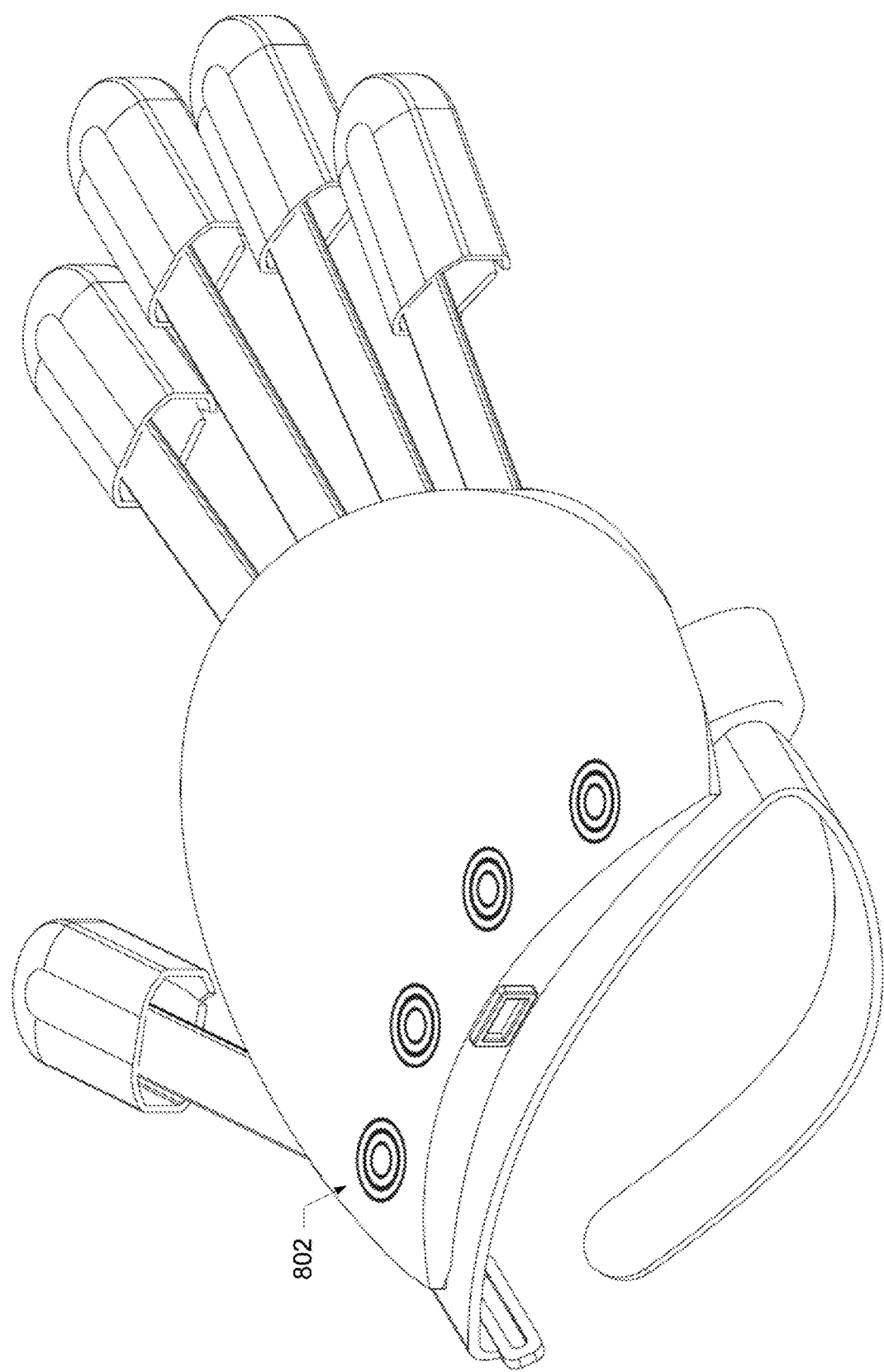
FIG. 8 is another perspective view of an apparatus for use with a human hand as enabled by the present disclosure.

According to a particular implementation illustrated in FIG. 8, the glove has one or more concentric circular fiducials 802 on the main body of the glove that are located by a fish-eye lens camera (not shown). Using the fiducials, the position of the glove may be determined with reference to the camera. The IMU raw accelerometer output is precise enough to support dead reckoning from the positions captured by the camera for a sufficient period of time between captured positions.

The center of a fiducial is used to determine an XY position in the plane of the image (e.g., in pixels), and the radius of the outside circle of the fiducial (e.g., in pixels) is used to determine a Z position normal to the plane of the image. Even if the image of the fiducial is skewed, because the outside portion of the fiducial is circular, an accurate measurement of its radius can be determined. An occasional determination of the position of the glove based on the fiducials coupled with the use of the accelerometer-based dead reckoning provides an ongoing solid estimate of the position of the glove in space relative to the camera.

The camera can have a fixed position in the room. Alternative, the camera can be associated with the user, e.g., mounted on a virtual reality headset. The hemispherical image from the fish-eye lens is flattened and computer-vision is used to recognize the fiducials. According to some implementations, colors may be used to make the fiducials easier to recognize. In cases where the camera is part of the headset, an IMU in the headset (e.g., in the smart phone in the headset) may be configured to do the head tracking. In such cases, the position of the glove is relative to the position/location of the headset IMU as determined by the head tracking.

LED Tracking

Figure 9:
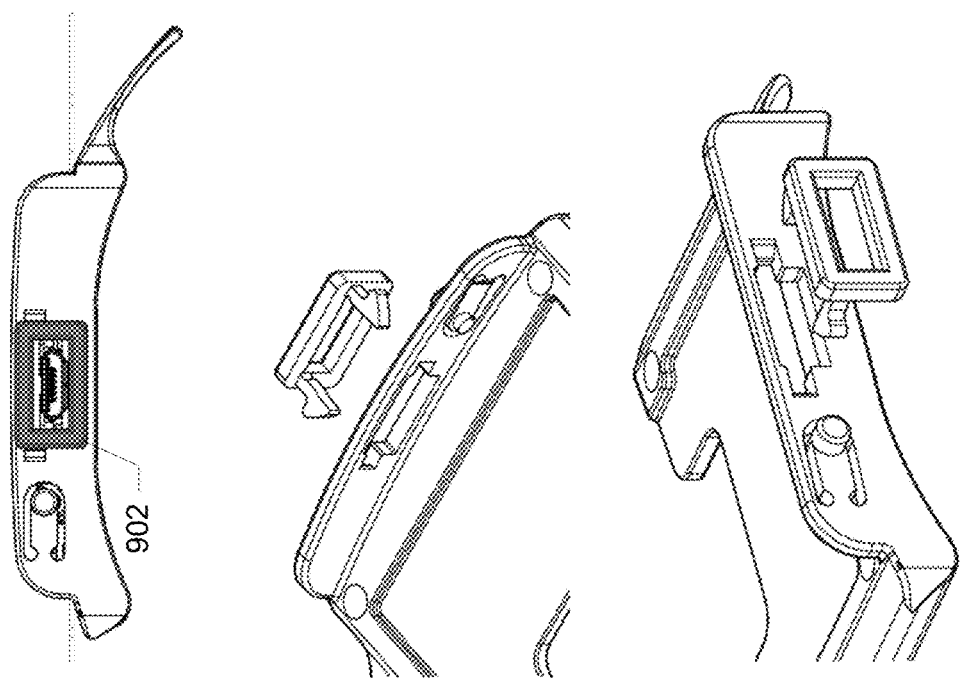
FIG. 9 includes various views of a portion of an apparatus for use with a human hand as enabled by the present disclosure.
Figure 9:
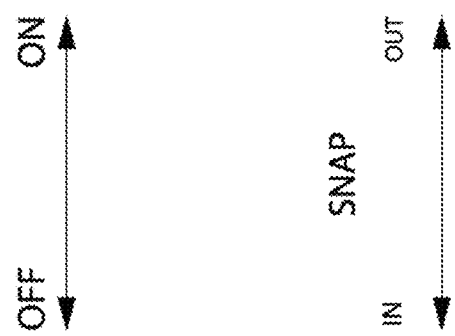
Figure 9:
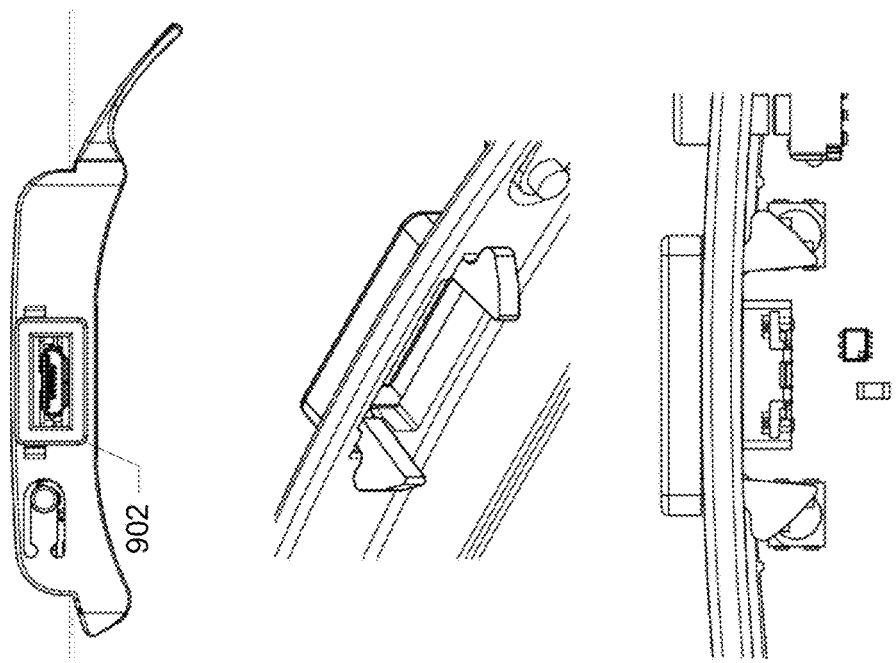

According to another implementation illustrated in FIG. 9, the glove includes one or more LEDs that illuminate a light pipe in the rectangular clip on the back of the glove surrounding the USB connector. Modulation and detection of the LEDs can result in fast operation of the visual tracking system. That is, using a camera to detect and identify a pure color from an LED is very fast. The XY position in the plane of the image (e.g., in pixels) is identified from the location of the LED array (e.g., its center).

The LEDs may be modulated so they are blank (i.e., not be visible to the camera) at some sub-frame multiple (e.g., once every 8 frames). Detection of the specific modulation scheme allows for detection of the specific LED array and, therefore, the corresponding glove. That is, the left glove may be modulated differently from the right so that the glove for which the LED light is detected can be identified.

According to a specific implementation, a distance estimation is based on light emitted from the USB connector frame/light-pipe 902. The light may be directly from 4 LEDs arranged around the frame, or from a light pipe illuminated from one or more light sources (e.g., LEDs) on the assembly's PCB. The distance estimation is based on the distances between each pair of LEDs or the horizontal and vertical edges of the light pipe (e.g., in pixels). An accurate measurement can be determined even if the connector frame is skewed with respect to the camera because the skew can be determined based on the ratio of the distance between the horizontal LEDs (or light pipe segments) and the distance between the vertical LEDs (or light pipe segments). This ratio can be used to correct for the skew to get a more accurate measurement of at least one of the two distances which can then be used to determine the distance from the camera. The apparent brightness of the LEDs or light pipe might also be used to determine distance from the camera, either in conjunction with or instead of these distance measurements.

Position Correction

Information from a virtual environment may also be used for position correction. For example, when the user is reaching for and/or possessing something (e.g., a weapon in a game) or pushing something in the virtual environment, there are constraints on allowable positions (e.g., based on virtual object collisions) that will allow for an understanding of where the glove is in the virtual environment and use of that information to make corrections. Bounding spheres, i.e., limits on perceptual orientation and range of motion, may provide additional constraints that may be used in determining position. For example, positions can be eliminated that are impossible (e.g., your hand can't be ten feet from your head).

It will be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects.

What is claimed is:

1. An apparatus, comprising:
    a sensor assembly including a plurality of digit sensor assemblies, each digit sensor assembly including one or more sensors on an elongated substrate, the one or more sensors of each digit sensor assembly being configured to generate one or more signals representing bending of the corresponding substrate;
    a textile assembly including a plurality of digit textile assemblies, each digit textile assembly being configured to align with a corresponding finger of a hand and including a fingertip portion for securing the digit textile assembly to a fingertip of the corresponding finger, each digit textile assembly also including a sleeve in which a corresponding one of the digit sensor assemblies is contained, the sleeve being connected at a first end of the sleeve to the fingertip portion of the digit textile assembly and being configured to align the corresponding digit sensor assembly with a back side of the corresponding finger, wherein the textile assembly is configured such that a middle portion of each finger is exposed, and wherein each digit sensor assembly is secured in the corresponding sleeve such that the digit sensor assembly slides relative to the sleeve when the digit sensor assembly bends;
    a base assembly connected to each of the sleeves of the digit textile assemblies at a second end of the sleeve opposing the first end, the base assembly being configured to secure the apparatus to the hand; and
    sensor circuitry configured to receive the signals from the digit sensor assemblies and to generate digital representations of the signals.

2. The apparatus of claim 1, wherein each sleeve comprises an elastic fabric.

3. The apparatus of claim 1, further comprising a plurality of haptic devices, each haptic device being integrated with the fingertip portion of a corresponding one of the digit textile assemblies.

4. The apparatus of claim 3, wherein each sleeve includes a first chamber in which the corresponding digit sensor assembly is contained, and a second chamber in which one or more conductors connected to the haptic device of the corresponding fingertip portion are contained.

5. The apparatus of claim 1, wherein each of the sleeves includes friction material on an outside surface of the sleeve configured for contacting the back side of the corresponding finger.

6. The apparatus of claim 1, wherein each digit sensor assembly includes at least two sensors, each of the sensors being configured to align with a corresponding knuckle of the corresponding finger.

7. The apparatus of claim 1, wherein each digit sensor assembly includes one or more stiffeners, each stiffener being aligned with a corresponding one of the one or more sensors of the digit sensor assembly and being configured to support a particular dynamic range of the corresponding sensor.

8. The apparatus of claim 1, wherein each sleeve includes one or more stiffeners, each stiffener being aligned with a corresponding one of the one or more sensors of the digit sensor assembly contained in the sleeve and being configured to support a particular dynamic range of the corresponding sensor.

9. The apparatus of claim 1, wherein each of the one or more sensors of each digit sensor assembly comprises either a piezoresistive material or a piezoelectric material.

10. The apparatus of claim 1, wherein the base assembly is configured to secure the apparatus to the hand with a strap, the strap having a haptic device integrated therewith such that, when the apparatus is secured to the hand with the strap, the haptic device is aligned with a palm of the hand.

11. An apparatus, comprising:
a sensor assembly including a plurality of digit sensor assemblies, each digit sensor assembly including one or more sensors on an elongated substrate, the one or more sensors of each digit sensor assembly being configured to generate one or more signals representing bending of the corresponding substrate;
a textile assembly including a plurality of digit textile assemblies, each digit textile assembly being configured to align with a corresponding finger of a hand and including a fingertip portion for securing the digit textile assembly to a fingertip of the corresponding finger, each digit textile assembly also including a sleeve in which a corresponding one of the digit sensor assemblies is contained, the sleeve being connected at a first end of the sleeve to the fingertip portion of the digit textile assembly and being configured to align the corresponding digit sensor assembly with a back side of the corresponding finger, wherein the textile assembly is configured such that a middle portion of each finger is exposed, and wherein each sleeve includes a first chamber in which the corresponding digit sensor assembly is contained, and a second chamber in which one or more conductors connected to the haptic device of the corresponding fingertip portion are contained;
a base assembly connected to each of the sleeves of the digit textile assemblies at a second end of the sleeve opposing the first end, the base assembly being configured to secure the apparatus to the hand; and
sensor circuitry configured to receive the signals from the digit sensor assemblies and to generate digital representations of the signals.

12. The apparatus of claim 11, wherein each digit sensor assembly is secured in the corresponding sleeve such that the digit sensor assembly slides relative to the sleeve when the digit sensor assembly bends.

13. The apparatus of claim 11, wherein each sleeve comprises an elastic fabric.

14. The apparatus of claim 11, further comprising a plurality of haptic devices, each haptic device being integrated with the fingertip portion of a corresponding one of the digit textile assemblies.

15. The apparatus of claim 11, wherein each of the sleeves includes friction material on an outside surface of the sleeve configured for contacting the back side of the corresponding finger.

16. The apparatus of claim 11, wherein each digit sensor assembly includes at least two sensors, each of the sensors being configured to align with a corresponding knuckle of the corresponding finger.

17. The apparatus of claim 11, wherein each digit sensor assembly includes one or more stiffeners, each stiffener being aligned with a corresponding one of the one or more sensors of the digit sensor assembly and being configured to support a particular dynamic range of the corresponding sensor.

18. The apparatus of claim 11, wherein each sleeve includes one or more stiffeners, each stiffener being aligned with a corresponding one of the one or more sensors of the digit sensor assembly contained in the sleeve and being configured to support a particular dynamic range of the corresponding sensor.

19. The apparatus of claim 11, wherein each of the one or more sensors of each digit sensor assembly comprises either a piezoresistive material or a piezoelectric material.

20. The apparatus of claim 11, wherein the base assembly is configured to secure the apparatus to the hand with a strap, the strap having a haptic device integrated therewith such that, when the apparatus is secured to the hand with the strap, the haptic device is aligned with a palm of the hand.

* * * * *